US011151493B2

(12) United States Patent
Auradkar et al.

(10) Patent No.: US 11,151,493 B2
(45) Date of Patent: Oct. 19, 2021

(54) INFRASTRUCTURE BENCHMARKING BASED ON DYNAMIC COST MODELING

(71) Applicant: Apptio, Inc., Bellevue, WA (US)

(72) Inventors: Rahul V. Auradkar, Sammamish, WA (US); Edward Mark Hayman, Monroe, WA (US); David Tijerina, Shoreline, WA (US); Venkatesh Krishnan, Sammamish, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/846,349

(22) Filed: Sep. 4, 2015

(65) Prior Publication Data

US 2017/0004430 A1   Jan. 5, 2017

Related U.S. Application Data

(60) Provisional application No. 62/187,110, filed on Jun. 30, 2015.

(51) Int. Cl.
*G06Q 10/06* (2012.01)
*G06Q 10/00* (2012.01)
(52) U.S. Cl.
CPC . *G06Q 10/06313* (2013.01); *G06Q 10/06375* (2013.01)
(58) Field of Classification Search
USPC ...................................................... 705/7.39
See application file for complete search history.

(56) References Cited

U.S. PATENT DOCUMENTS

| 4,744,026 A | 5/1988 | Vanderbei |
| 5,249,120 A | 9/1993 | Foley |
| 5,615,121 A | 3/1997 | Babayev et al. |

(Continued)

FOREIGN PATENT DOCUMENTS

JP       2011134268 A    7/2011

OTHER PUBLICATIONS

Apptio TBM Unified Model: The Standard Cost Model for IT, Apptio, 2014 (Year: 2014).*

(Continued)

*Primary Examiner* — Brian M Epstein
*Assistant Examiner* — Allison M Neal
(74) *Attorney, Agent, or Firm* — John W. Branch; Branch Partners PLLC

(57) ABSTRACT

Embodiments are directed towards infrastructure benchmarking based on dynamic cost modeling. Raw customer models that represent a customer's business system may be ingested into a benchmarking system and mapped to customer models based on one or more standard models. Benchmarking information that may be generated from one or more community models that are one or more customer models of other customers that may be available to the benchmarking application. Additional third-party information, such as, industry survey information may also be used for generating benchmarking information. The benchmarking information may be used to generate reports that include comparisons between one or more customer models and the one or more community models. The benchmarking information may be continuously updated based on changes to customer models and/or data, community models and/or data, external information.

24 Claims, 23 Drawing Sheets

(56) References Cited

U.S. PATENT DOCUMENTS

| | | |
|---|---|---|
| 5,721,919 A | 2/1998 | Morel et al. |
| 5,758,327 A | 5/1998 | Gardner et al. |
| 5,799,286 A | 8/1998 | Morgan et al. |
| 5,802,508 A | 9/1998 | Morgenstern |
| 5,903,453 A | 5/1999 | Stoddard, II |
| 5,970,476 A | 10/1999 | Fahey |
| 5,991,741 A | 11/1999 | Speakman et al. |
| 6,014,640 A | 1/2000 | Bent |
| 6,032,123 A | 2/2000 | Jameson |
| 6,047,290 A | 4/2000 | Kennedy et al. |
| 6,208,993 B1 | 3/2001 | Shadmon |
| 6,249,769 B1 | 6/2001 | Ruffin et al. |
| 6,253,192 B1 | 6/2001 | Corlett et al. |
| 6,308,166 B1 | 10/2001 | Breuker et al. |
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 * | 5/2004 | Bond .................. G06Q 10/06 700/100 |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 8/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,761,548 B2 | 7/2010 | Snyder et al. |
| 7,769,654 B1 | 8/2010 | Hurewitz |
| 7,774,458 B2 | 8/2010 | Trinon et al. |
| 7,783,759 B2 | 8/2010 | Ellam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 7,966,266 B2 | 6/2011 | Delvat |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,121,959 B2 | 2/2012 | Delvat |
| 8,175,863 B1 | 5/2012 | Ostermeyer et al. |
| 8,195,524 B2 | 6/2012 | Sandholm et al. |
| 8,195,785 B2 | 6/2012 | Snyder et al. |
| 8,200,518 B2 | 6/2012 | Bailey et al. |
| 8,200,561 B1 | 6/2012 | Scott et al. |
| 8,209,218 B1 | 6/2012 | Basu et al. |
| 8,214,829 B2 | 7/2012 | Neogi et al. |
| 8,260,959 B2 | 9/2012 | Rudkin et al. |
| 8,370,243 B1 | 2/2013 | Cernyar |
| 8,396,775 B1 | 3/2013 | Mindlin |
| 8,423,428 B2 | 4/2013 | Grendel et al. |
| 8,484,355 B1 | 7/2013 | Lochhead et al. |
| 8,543,438 B1 | 9/2013 | Fleiss |
| 8,600,830 B2 | 12/2013 | Hoffberg |
| 8,601,263 B1 | 12/2013 | Shankar et al. |
| 8,606,827 B2 | 12/2013 | Williamson |
| 8,655,714 B2 | 2/2014 | Weir et al. |
| 8,667,385 B1 | 3/2014 | Mui et al. |
| 8,766,981 B2 | 7/2014 | McLachlan et al. |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 * | 12/2015 | French .................. G06F 9/4856 |
| 9,268,964 B1 | 2/2016 | Schepis et al. |
| 9,281,012 B2 | 3/2016 | Hedges |
| 9,384,511 B1 | 7/2016 | Purpus |
| 9,529,863 B1 | 12/2016 | Gindin et al. |
| 9,805,311 B1 | 10/2017 | Mohler |
| 10,152,722 B2 | 12/2018 | Heath |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1 | 6/2002 | Vellante et al. |
| 2002/0082966 A1 | 6/2002 | O'Brien et al. |
| 2002/0087441 A1 | 7/2002 | Wagner, Jr. et al. |
| 2002/0107914 A1 | 8/2002 | Charisius et al. |
| 2002/0123945 A1 | 9/2002 | Booth et al. |
| 2002/0129342 A1 | 9/2002 | Kil et al. |
| 2002/0145040 A1 | 10/2002 | Grabski |
| 2002/0154173 A1 | 10/2002 | Etgen et al. |
| 2002/0156710 A1 | 10/2002 | Ryder |
| 2002/0174006 A1 | 11/2002 | Rugge et al. |
| 2002/0174049 A1 | 11/2002 | Kitahara |
| 2002/0178198 A1 | 11/2002 | Steele |
| 2002/0194329 A1 | 12/2002 | Alling |
| 2003/0019350 A1 | 1/2003 | Khosla |
| 2003/0074269 A1 | 4/2003 | Viswanath |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0103013 A1 * | 5/2004 | Jameson .......... G06Q 10/06393 705/7.28 |
| 2004/0111509 A1 | 6/2004 | Eilam et al. |
| 2004/0133876 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |

(56) References Cited

U.S. PATENT DOCUMENTS

| | | |
|---|---|---|
| 2005/0033631 A1 | 2/2005 | Wefers et al. |
| 2005/0037326 A1 | 2/2005 | Kuntz et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1* | 4/2005 | Retsina .................. G06Q 10/10 705/7.39 |
| 2005/0120032 A1 | 6/2005 | Liebich et al. |
| 2005/0131870 A1 | 6/2005 | Krishnaswamy et al. |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Hartchryde et al. |
| 2007/0198982 A1 | 8/2007 | Bolan et al. |
| 2007/0214413 A1 | 9/2007 | Boeckenhauer |
| 2007/0226064 A1 | 9/2007 | Yu et al. |
| 2007/0226090 A1 | 9/2007 | Stratton |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1* | 8/2008 | Hawley ............ G06Q 10/06393 705/7.39 |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0210275 A1 | 8/2009 | Andreev et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1* | 2/2010 | Radibratovic ......... G06Q 10/04 703/13 |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0225277 A1 | 9/2011 | Freimuth et al. |
| 2011/0238608 A1* | 9/2011 | Sathish .............. G06Q 30/0631 706/47 |
| 2011/0261049 A1 | 10/2011 | Cardno et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |

(56) References Cited

U.S. PATENT DOCUMENTS

| | | | |
|---|---|---|---|
| 2012/0232947 A1* | 9/2012 | McLachlan | G06Q 10/06 705/7.23 |
| 2012/0233217 A1 | 9/2012 | Purpus et al. | |
| 2012/0233547 A1 | 9/2012 | McLachlan | |
| 2012/0239739 A1* | 9/2012 | Manglik | G06F 9/5077 709/203 |
| 2012/0246046 A1 | 9/2012 | Hirsch | |
| 2012/0272234 A1* | 10/2012 | Kaiser | G06F 11/3442 718/1 |
| 2012/0330869 A1 | 12/2012 | Durham | |
| 2013/0014057 A1 | 1/2013 | Reinpoldt et al. | |
| 2013/0028537 A1 | 1/2013 | Miyake et al. | |
| 2013/0041792 A1 | 2/2013 | King et al. | |
| 2013/0041819 A1 | 2/2013 | Khasho | |
| 2013/0060595 A1 | 3/2013 | Bailey | |
| 2013/0066866 A1 | 3/2013 | Chan et al. | |
| 2013/0091456 A1 | 4/2013 | Sherman et al. | |
| 2013/0091465 A1 | 4/2013 | Kikin-Gil et al. | |
| 2013/0103369 A1 | 4/2013 | Huynh et al. | |
| 2013/0103654 A1 | 4/2013 | McLachlan et al. | |
| 2013/0124454 A1 | 5/2013 | Bhide et al. | |
| 2013/0124459 A1 | 5/2013 | Iwase et al. | |
| 2013/0138470 A1 | 5/2013 | Goyal et al. | |
| 2013/0159926 A1 | 6/2013 | Vainer et al. | |
| 2013/0173159 A1 | 7/2013 | Trum et al. | |
| 2013/0179371 A1 | 7/2013 | Jain et al. | |
| 2013/0201193 A1 | 8/2013 | McLachlan et al. | |
| 2013/0227584 A1 | 8/2013 | Greene et al. | |
| 2013/0268307 A1 | 10/2013 | Li et al. | |
| 2013/0282537 A1 | 10/2013 | Snider | |
| 2013/0290470 A1 | 10/2013 | CaraDonna et al. | |
| 2013/0293551 A1 | 11/2013 | Erez et al. | |
| 2013/0339274 A1 | 12/2013 | Willis et al. | |
| 2013/0346390 A1 | 12/2013 | Jerzak et al. | |
| 2014/0006085 A1 | 1/2014 | McLachlan et al. | |
| 2014/0006222 A1 | 1/2014 | Hericks et al. | |
| 2014/0067632 A1 | 3/2014 | Curtis | |
| 2014/0075004 A1 | 3/2014 | Van Dusen et al. | |
| 2014/0089509 A1* | 3/2014 | Akolkar | H04L 41/5096 709/226 |
| 2014/0108295 A1 | 4/2014 | Renshaw | |
| 2014/0122374 A1 | 5/2014 | Hacigumus et al. | |
| 2014/0129583 A1 | 5/2014 | Munkes et al. | |
| 2014/0136295 A1 | 5/2014 | Wasser | |
| 2014/0143175 A1 | 5/2014 | Greenshields et al. | |
| 2014/0172918 A1 | 6/2014 | Kornmann et al. | |
| 2014/0229212 A1 | 8/2014 | MacElheron et al. | |
| 2014/0244364 A1 | 8/2014 | Evers | |
| 2014/0252095 A1 | 9/2014 | Kikin | |
| 2014/0257928 A1 | 9/2014 | Chen et al. | |
| 2014/0278459 A1 | 9/2014 | Morris | |
| 2014/0279121 A1 | 9/2014 | George et al. | |
| 2014/0279201 A1* | 9/2014 | Iyoob | G06F 9/5077 705/26.7 |
| 2014/0279676 A1 | 9/2014 | Schafer et al. | |
| 2014/0279947 A1 | 9/2014 | Chachra et al. | |
| 2014/0288987 A1 | 9/2014 | Liu | |
| 2014/0310233 A1 | 10/2014 | Catalano et al. | |
| 2014/0337007 A1 | 11/2014 | Waibel et al. | |
| 2014/0351166 A1 | 11/2014 | Schlossberg | |
| 2014/0365503 A1 | 12/2014 | Franceschini et al. | |
| 2014/0365504 A1 | 12/2014 | Franceschini et al. | |
| 2015/0006552 A1 | 1/2015 | Lord | |
| 2015/0012328 A1 | 1/2015 | McLachlan et al. | |
| 2015/0046363 A1 | 2/2015 | McNamara et al. | |
| 2015/0066808 A1 | 3/2015 | Legare et al. | |
| 2015/0074075 A1 | 3/2015 | Alexander | |
| 2015/0088584 A1 | 3/2015 | Santiago, III et al. | |
| 2015/0120370 A1 | 4/2015 | Agrawal et al. | |
| 2015/0120373 A1* | 4/2015 | Bajaj | G06Q 10/06315 705/7.25 |
| 2015/0149257 A1 | 5/2015 | Bielat et al. | |
| 2015/0227991 A1 | 8/2015 | Yu | |
| 2015/0234944 A1* | 8/2015 | Marceau | G06F 30/13 703/1 |
| 2015/0278024 A1 | 10/2015 | Barman et al. | |
| 2015/0294273 A1 | 10/2015 | Barraci et al. | |
| 2015/0302303 A1 | 10/2015 | Hakim | |
| 2015/0341230 A1 | 11/2015 | Dave et al. | |
| 2015/0363725 A1 | 12/2015 | Anderson et al. | |
| 2015/0379061 A1 | 12/2015 | Paraschivescu | |
| 2016/0063577 A1 | 3/2016 | Yellin et al. | |
| 2016/0098234 A1 | 4/2016 | Weaver et al. | |
| 2016/0266594 A1* | 9/2016 | Kauffman | G06Q 50/06 |
| 2017/0102246 A1 | 4/2017 | Yang | |
| 2018/0068246 A1 | 3/2018 | Crivat et al. | |

OTHER PUBLICATIONS

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#. Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#. Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

(56) References Cited

OTHER PUBLICATIONS

International Search Report and Written Opinion for International Patent Application No. PCT/US2010/035021 dated Jul. 14, 2010.
International Preliminary Report on Patentability for International Patent Application No. PCT/US2010/035021 dated Nov. 24, 2011.
International Search Report and Written Opinion for International Patent Application No. PCT/US2012/028353 dated Oct. 31, 2012.
International Preliminary Reporton Patentability for International Patent Application No. PCT/US2012/028353 dated Sep. 19, 2013.
International Search Report and Written Opinion for International Patent Application No. PCT/US2012/028378 dated Sep. 12, 2012.
International Preliminary Report on Patentability for International Patent Application No. PCT/US2012/028378 dated Sep. 19, 2013.
Extended European Search Report in EP Application No. 13151967.0-1955, dated Apr. 19, 2013.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/935,147 dated Oct. 22, 2013.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15, 2015.
Official Communication for U.S. Appl. No. 13/452,628 dated Nov. 18, 2013.
Official Communication for U.S. Appl. No. 14/033,130 dated Dec. 16, 2013.
Official Communication for U.S. Appl. No. 13/324,253 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/837,815 dated Apr. 7, 2014.
Office Communication for U.S. Appl. No. 13/675,837 dated Jan. 31, 2014.
Office Communication for U.S. Appl. No. 13/675,837 dated Apr. 2, 2014.
Office Communication for U.S. Appl. No. 13/917,503 dated Apr. 3, 2014.
Office Communication for U.S. Appl. No. 13/935,147 dated Apr. 11, 2014.
Office Communication for U.S. Appl. No. 13/935,147 dated Jun. 16, 2014.
Office Communication for U.S. Appl. No. 14/033,130 dated May 27, 2014.
Office Communication for U.S. Appl. No. 14/033,130 dated Aug. 5, 2014.
Office Communication for U.S. Appl. No. 14/180,308 dated Jan. 30, 2015.
Office Communication for U.S. Appl. No. 14/180,308 dated Apr. 8, 2014.
Office Communication for U.S. Appl. No. 13/452,628 dated Mar. 13, 2014.
SAS Activity-Based Management, 2010, Fact Sheet, 4 pages.
Office Communication for U.S. Appl. No. 14/180,308 dated Sep. 2, 2014.
Office Communication for U.S. Appl. No. 14/180,308 dated Apr. 17, 2015.
Extended European Search Report in EP Application No. 14159413.5 dated Jul. 4, 2014.
Office Communication for U.S. Appl. No. 13/415,797 dated Jan. 12, 2015.
Office Communication for U.S. Appl. No. 13/837,815 dated Sep. 25, 2014.
Office Communication for U.S. Appl. No. 13/324,253 dated Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015.
European Search Report for Application No. 12755613.2 dated Jan. 26, 2015.

(56) References Cited

OTHER PUBLICATIONS

Office Communication for U.S. Appl. No. 13/452,628 dated Mar. 30, 2015.
Office Communication for U.S. Appl. No. 13/917,503 dated Apr. 16, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
Official Communication for U.S. Appl. No. 13/452,628 dated April 22, 2013.
Office Communication for U.S. Appl. No. 13/415,797 dated Oct. 19, 2015.
Office Communication for U.S. Appl. No. 13/837,815 dated Sep. 28, 2015.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Official Communication for U.S. Appl. No. 13/649,019 dated Jan. 4, 2016, 8 pages.
Official Communication for U.S. Appl. No. 14/869,721 dated Jan. 13, 2016, 57 pages.
Official Communication for U.S. Appl. No. 13/452,628 dated Jan. 12, 2016, 21 pages.
Office Communication for U.S. Appl. No. 13/415,797 dated Oct. 19, 2015, 3 pages.
Office Communication for U.S. Appl. No. 13/837,815 dated Sep. 28, 2015, 20 pages.
European Examination Report for Application No. 14159413.5 dated Jul. 15, 2015, 9 pages.
Office Communication for U.S. Appl. No. 13/415,701 dated Oct. 27, 2015, 16 pages.
Office Communication for U.S. Appl. No. 13/365,150 dated Dec. 7, 2015, 3 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/837,815 dated Jun. 23, 2016, 3 pages.
Official Communication for U.S. Appl. No. 14/981,747 dated Jul. 14, 2016, 29 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 14/180,308 dated Feb. 8, 2017, 3 pages.
Official Communication for U.S. Appl. No. 13/452,628 dated Mar. 9, 2017, 24 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 13/365,150 dated May 22, 2017, 3 pages.

(56) References Cited

OTHER PUBLICATIONS

Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 14/180,308 dated May 25, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 15/351,313 dated Jul. 18, 2017, 15 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 13/917,503 dated Nov. 28, 2017, 26 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No 14/180,308 dated Dec. 22, 2017.
Official Communication for U.S. Appl. No 15/271,013 dated Dec. 27, 2017.
Official Communication for U.S. Appl. No 15/260,221 dated Jan. 9, 2018.
Official Communication for U.S. Appl. No 15/379,267 dated Jan. 2, 2018.
Official Communication for U.S. Appl. No 15/351,313 dated Jan. 8, 2018.
Official Communication for U.S. Appl. No. 13/837,815 dated Jan. 26, 2018, 12 pages.
Official Communication for U.S. Appl. No. 14/869,721 dated Jan. 19, 2018, 3 pages.
Official Communication for U.S. Appl. No. 14/867,552 dated Feb. 13, 2018, 3 pages.
Official Communication for U.S. Appl. No. 15/859,008 dated Mar. 5, 2018, 20 pages.
Official Communication for U.S. Appl. No. 13/935,147 dated Jan. 17, 2018, 3 pages.
Official Communication for U.S. Appl. No. 13/917,503 dated Nov. 20, 2018.
Official Communication for U.S. Appl. No. 13/917,147 dated Aug. 10, 2018.
Official Communication for U.S. Appl. No. 14/033,130 dated Aug. 9, 2018.
Official Communication for U.S. Appl. No. 14/180,308 dated Aug. 6, 2018.
Official Communication for U.S. Appl. No. 14/867,552 dated Nov. 21, 2018.
Official Communication for U.S. Appl. No. 14/869,721 dated Oct. 11, 2018.
Official Communication for U.S. Appl. No. 14/981,747 dated Jul. 5, 2018.
Official Communication for U.S. Appl. No. 15/260,221 dated Oct. 5, 2018.
Official Communication for U.S. Appl. No. 15/271,013 dated Jul. 6, 2018.
Official Communication for U.S. Appl. No. 15/858,945 dated Aug. 10, 2018.
Official Communication for U.S. Appl. No. 15/858,008 dated Jul. 31, 2018.
Official Communication for U.S. Appl. No. 15/859,058 dated Dec. 5, 2018.
Official Communication for U.S. Appl. No. 15/379,267 dated Jul. 19, 2018.
Official Communication for U.S. Appl. No. 15/379,267 dated Oct. 18, 2018.
Official Communication for U.S. Appl. No. 14/033,130 dated Dec. 18, 2018.
Official Communication for U.S. Appl. No. 15/271,013 dated Dec. 18, 2018.
Official Communication for U.S. Appl. No. 13/917,503 dated Apr. 1, 2019, pp. 1-34.
Official Communication for U.S. Appl. No. 13/935,147 dated Mar. 28, 2019, pp. 1-16.
Official Communication for U.S. Appl. No. 14/033,130 dated Apr. 10, 2019, pp. 1-9.
Official Communication for U.S. Appl. No. 14/180,308 dated Feb. 26, 2019, pp. 1-28.
Official Communication for U.S. Appl. No. 14/867,552 dated Feb. 11, 2019, pp. 1-8.
Official Communication for U.S. Appl. No. 14/981,747 dated Dec. 26, 2018, pp. 1-50.
Official Communication for U.S. Appl. No. 15/260,221 dated Jan. 8, 2019, pp. 1-19.
Official Communication for U.S. Appl. No. 15/271,013 dated Mar. 28, 2019, pp. 1-53.
Official Communication for U.S. Appl. No. 15/351,313 dated Apr. 1, 2019, pp. 1-31.
Official Communication for U.S. Appl. No. 15/585,945 dated Feb. 6, 2019, pp. 1-15.
Official Communication for U.S. Appl. No. 15/859,058 dated Mar. 25, 2019, pp. 1-24.
Official Communication for U.S. Appl. No. 15/859,008 dated Apr. 12, 2019, pp. 1-19.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 14/981,747 dated May 8, 2019, pp. 1-77.

(56) References Cited

OTHER PUBLICATIONS

Official Communication for U.S. Appl. No. 15/271,013 dated Jun. 14, 2019, pp. 1-8.
Official Communication for U.S. Appl. No. 14/981,747 dated Aug. 1, 2019, pp. 1-5.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Selen, et al. "Model-Order Selection: A review of information criterion rules," IEEE Signal Processing Magazine, Jul. 2004, pp. 38-47.
Official Communication for U.S. Appl. No. 13/917,503 dated Apr. 1, 2019.
Official Communication for U.S. Appl. No. 13/935,147 dated Mar. 28, 2019.
Official Communication for U.S. Appl. No. 14/033,130 dated Apr. 10, 2019.
Official Communication for U.S. Appl. No. 14/180,308 dated Feb. 26, 2019.
Official Communication for U.S. Appl. No. 14/867,552 dated Feb. 11, 2019.
Official Communication for U.S. Appl. No. 14/981,747 dated Dec. 26, 2018.
Official Communication for U.S. Appl. No. 15/260,221 dated Jan. 8, 2019.
Official Communication for U.S. Appl. No. 15/271,013 dated Mar. 28, 2019.
Official Communication for U.S. Appl. No. 15/351,313 dated Apr. 1, 2019.
Official Communication for U.S. Appl. No. 15/585,945 dated Feb. 6, 2019.
Official Communication for U.S. Appl. No. 15/859,058 dated Mar. 25, 2019.
Official Communication for U.S. Appl. No. 15/859,008 dated Apr. 12, 2019.
Beraldi, et al., "A Clustering Approach for Scenario Tree Reduction: an Application to a Stochastic Programming Portfolio Optimization Problem," TOP, vol. 22, No. 3, 2014, pp. 934-949.
Official Communication for U.S. Appl. No. 15/271,013 dated Mar. 23, 2020, pp. 1-45.
Official Communication for U.S. Appl. No. 14/981,747 dated Apr. 23, 2020, pp. 1-14.
Official Communication for U.S. Appl. No. 14/981,747 dated Oct. 24, 2019, pp. 1-62.
Official Communication for U.S. Appl. No. 15/271,013 dated Nov. 21, 2019, pp. 1-108.
Official Communication for U.S. Appl. No. 15/859,008 dated Oct. 24, 2019, pp. 1-22.
Daytime vs Night display on Garmin GPS , POI Factory, Jun. 2008, http://www.poi-factory.com/node/14562 (Year: 2008), pp. 1-3.
Official Communication for U.S. Appl. No. 14/180,308 dated Dec. 10, 2019, pp. 1-29.
Official Communication for U.S. Appl. No. 13/917,503 dated Dec. 31, 2019, pp. 1-28.
Official Communication for U.S. Appl. No. 15/859,008 dated Feb. 26, 2020, pp. 1-8.
Official Communication for U.S. Appl. No. 14/180,308 dated Mar. 9, 2020, pp. 1-5.
Office Communication for U.S. Appl. No. 13/917,503 dated May 7, 2020, pp. 1-25.
Office Communication for U.S. Appl. No. 14/180,308 dated May 11, 2020, pp. 1-18.
Office Communication for U.S. Appl. No. 15/859,008 dated May 28, 2020, pp. 1-20.
Office Communication for U.S. Appl. No. 15/271,013 dated Jun. 15, 2020, pp. 1-6.
Office Communication for U.S. Appl. No. 13/917,503 dated Jul. 29, 2020, pp. 1-6.
Examination Report for UK Patent Application No. GB1617238.9 dated Sep. 24, 2020, pp. 1-7.
Office Communication for U.S. Appl. No. 15/859,008 dated Oct. 9, 2020, pp. 1-22.
Office Communication for U.S. Appl. No. 14/180,308 dated Oct. 13, 2020, pp. 1-17.
Office Communication for U.S. Appl. No. 13/917,503 dated Nov. 27, 2020, pp. 1-23.
Office Communication for U.S. Appl. No. 15/271,013 dated Dec. 10, 2020, pp. 1-39.
Office Communication for U.S. Appl. No. 14/180,308 dated Jan. 11, 2021, pp. 1-4.
Examination Report for UK Patent Application No. GB1617238.9 dated Feb. 24, 2021, pp. 1-7.
Examination Report For UK Patent Application No. GB1621064.3 dated Feb. 26, 2021, pp. 1-3.
Office Communication for U.S. Appl. No. 14/ 180,308 dated Apr. 6, 2021, pp. 1-19.
Office Communication for U.S. Appl. No. 15/859,008 dated Apr. 19, 2021, pp. 1-23.
Office Communication for U.S. Appl. No. 14/180,308 dated Dec. 10, 2020, pp. 1-39.
Office Communication for U.S. Appl. No. 15/859,008 dated Apr. 6, 2021, pp. 1-19.
Office Communication for U.S. Appl. No. 14/867,552, dated Apr. 25, 2016, 12 pages.
Office Communication for U.S. Appl. No. 14/033,130, dated Apr. 25, 2016, 4 pages.
Office Communication for U.S. Appl. No. 14/971,944, dated May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 14/869,721 dated Jun. 1, 2016, 35 pages.
Official Communication for U.S. Appl. No. 14/977,368 dated Jun. 7, 2016, 11 pages.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 14/867,552 dated May 31, 2018, pp. 1-22.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 13/917,503 dated Nov. 20, 2018, pp. 1-55.
Official Communication for U.S. Appl. No. 13/917,147 dated Aug. 10, 2018, pp. 1-25.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 14/867,552 dated Nov. 21, 2018, pp. 1-37.
Official Communication for U.S. Appl. No. 14/869,721 dated Oct. 11, 2018, pp. 1-73.
Official Communication for U.S. Appl. No. 14/981,747 dated Jul. 5, 2018, pp. 1-62.
Official Communication for U.S. Appl. No. 15/260,221 dated Oct. 5, 2018, pp. 1-40.
Official Communication for U.S. Appl. No. 15/271,013 dated Jul. 6, 2018, pp. 1-49.
Official Communication for U.S. Appl. No. 15/858,945 dated Aug. 10, 2018, pp. 1-25.

(56) References Cited

OTHER PUBLICATIONS

Official Communication for U.S. Appl. No. 15/858,008 dated Jul. 31, 2018, pp. 1-28.
Official Communication for U.S. Appl. No. 15/859,058 dated Dec. 5, 2018, pp. 1-20.
Official Communication for U.S. Appl. No. 15/379,267 dated Jul. 19, 2018, pp. 1-34.
Official Communication for U.S. Appl. No. 15/379,267 dated Oct. 18, 2018, pp. 1-9.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.

* cited by examiner

500

| GL Actuals.ID | Cost |
|---|---|
| 301, Payroll (IT OPERATIONS) | $237,000 |
| 330, Employee Benefits (IT OPERATIONs) | $49,000 |
| 320, Payroll Taxes (IT OPERATIONS) | $4,100 |
| 760, Repairs (IT OPERATIONS) | $18,000 |
| 759, Rent Equipment (IT OPERATIONS) | $18,000 |
| 711, Fees and Consulting (IT OPERATIONS) | $7,600 |
| 650, Training (IT OPERATIONS) | $6,200 |
| 777, Miscellaneous Expense | $1,800 |

| Sub Towers | Customer Actuals | Benchmark Values | Delta |
|---|---|---|---|
| LAN | $ 12,000.00 | $ 10,000.00 | 20% |
| Linux | $ 12,000.00 | $ 3,000.00 | 300% |
| Mainframe | $ 8,000.00 | $ 12,000.00 | -33% |
| Unix | $ 4,000.00 | $ 2,000.00 | 100% |
| Voice | $ 5,500.00 | $ 5,000.00 | 10% |
| Windows | $ 2,000.00 | $ 10,000.00 | -80% |
| Workstations | $ 5,000.00 | $ 5,000.00 | 0% |
| Mobile | $ 7,000.00 | $ 5,000.00 | 40% |

FIG. 9

INFRASTRUCTURE BENCHMARKING BASED ON DYNAMIC COST MODELING

CROSS-REFERENCE TO RELATED APPLICATIONS

This application is a Utility Patent application based on a previously filed U.S. Provisional Patent Application U.S. Ser. No. 62/187,110 filed on Jun. 30, 2015, entitled "INFRASTRUCTURE BENCHMARKING BASED ON DYNAMIC COST MODELING," the benefit of the filing date of which is hereby claimed under 35 U.S.C. § 119(e) and which is further incorporated by reference in its entirety.

TECHNICAL FIELD

The present invention relates generally to computer automated activity based budget modeling, forecasting and cost accounting, and more particularly, but not exclusively to generating benchmarks for evaluating budget modeling, forecasting and cost accounting.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger enterprises, sophisticated computer programs and computing devices are often required to assist in generating useful and relevant budgets based on financial allocation models. In some cases the complexity of the models and the modelled items and entities may make it difficult to compare efficiencies across large enterprises and/or between different enterprises. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 9 illustrates a logical representation of a benchmark comparison table that is in accordance with at least one of the various embodiments;

DESCRIPTION OF THE VARIOUS EMBODIMENTS

Figure 1:
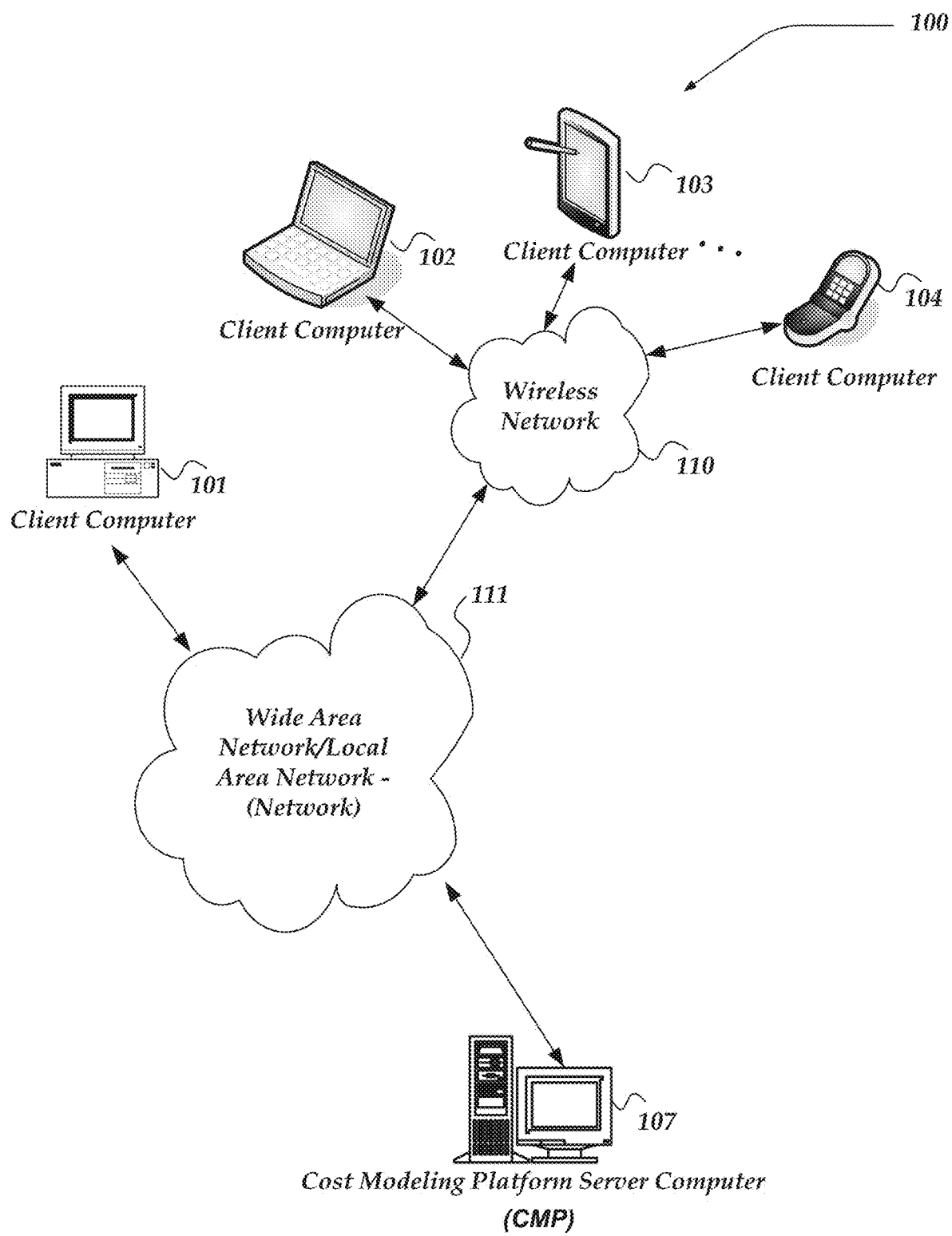
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "Cost line item," refers to a single line item in a budget (or finance allocation model) and its associated cost/expense. For example, the costs associated with a particular computer that is an email server may be a single item having a particular cost (e.g., the email server may correspond to a cost line item).

As used herein, the term "category," refers to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category.

As used herein, the terms "allocation rules," "entity propagation rules," or "propagation rules" refer to rules in the financial data model that determine how the costs/expenses from a category are apportioned between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category as well as the cost line item level.

As used herein, the term "assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the terms "business system" and/or "generated business system," refers to a system that has been generated using the budget and forecasting platform. Various embodiments disclosed herein may be related to financial applications. But, one of ordinary skill in the art will appreciate that generated business systems are not limited to financial applications.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "total cost value" refers to a value that is determined for providing at least one offering. A model for determining the total cost value of at least one offering is based at least on an allocation of cost data to at least one category in a category template in a cost model.

As used herein, the term "source object" refers to an object in a financial data model that may be providing values (e.g., costs/expenses) that may be allocated to one or more other objects (target objects). In at least one of the various embodiments, source objects may be used to represent one or more categories in a data model.

As used herein, the term "target object" refers to an object in a financial data model that may be allocated values (e.g., costs/expenses) from one or more other objects (source objects). In at least one of the various embodiments, target objects may be used to represent one or more categories in a data model.

As used herein, the term "raw customer model" refers to a data structure and/or dataset that describes a customer's business systems. For example, a financial model of a company's cost structures.

As used herein, the term "raw customer data" refers to the dataset associated with a raw customer model. In some cases, the raw customer data may be inherently included in the raw customer model. In some embodiments raw customer models and their corresponding raw customer data may be provided in various formats. In simple cases, raw customer models may be spreadsheets, database table information, csv files, or the like. In other cases, raw customer models may be structured XML files, models from one or more cost modeling systems, or the like.

As used herein, the term "standard model" refers to a model that may be used as a template and/or example to generate customer models (described below). The standard models may include taxonomies that provide a common definition/structure that facilitate generating benchmarking information. Standard models may be considered templates for financial allocation models, cost models, data models, or the like.

As used herein, the term "customer model" refers to a model of a customer business system that is generated by mapping a raw customer model to some or all of a standard model. The customer model is a model produced from a raw customer model that may be used in the benchmarking process. Customer models may be financial allocation models, cost models, data models, or the like.

As used herein, the term "community model" refers to other customer models that a benchmarking application may refer to if generating benchmarking information. Community models are customer models for other customers. In some embodiments, a customer model may be compared to one or more community models.

As used herein, the term "model elements" refers to items that comprises a given model. The model elements comprising customer models may be considered categories in financial allocation models, cost models, or the like. Also, in some embodiments, model elements may be considered towers or sub-towers of cost models. One or more model elements in a raw customer model may be mapped to one or more elements of a customer model based on a standard model.

As used herein, the term "benchmarking information" refers to values that are computers and/or generated from various sources, such as, community models, third-party/external information, industry surveys, or the like. Benchmarking information may be ratios, ranges, averages, means, median, min/max values, time-series, regressions, or the like, or combination thereof, related to values associated with one or more model elements. A benchmarking application may be arranged to generate various types of benchmarking information depending on the benchmark types, model types, model compositions, configurations, user input, or the like, or combination thereof.

As used herein the term "benchmark engine" refers to a system that generates one or more benchmark values based on one or more inputs. Benchmark engines may be generated from benchmark information and benchmark data derived from one or more community models. Once a benchmark engine is generated benchmark values may be computed absent benchmark information and/or benchmark data.

As used herein the term "benchmark component" refers to a cost driver for a model item that may comprise the benchmark engine. For example, a benchmark component for benchmarking the total unit cost of servers may be the number of servers under management. Other benchmark components for servers may include, the number of CPUs, geographic location, average age of servers, type/brand of servers, or the like. Each benchmark component contributes to the benchmark engine for a given model item. Not every benchmark component is significant. Accordingly, during the generating of a benchmark engine one or more benchmark components may be excluded.

As used herein the term "customer benchmark value" refers to a benchmark value that is generated from a benchmark engine.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards infrastructure benchmarking based on dynamic cost modeling. In at least one of the various embodiments, raw customer models that may represent a customer's business system may be ingested into a benchmarking system and mapped to a customer model based on one or more standard models. In at least one of the various embodiments, a benchmarking application may include a mapping engine the uses one or more rules for determining how to map elements of raw customer models into customer models.

In at least one of the various embodiments, benchmarking information that may be generated from one or more community models. In at least one of the various embodiments, community models may be one or more customer models of other customers that may be available in a cloud computing environment, or the like. In at least one of the various embodiments, additional third-party information, such as, industry survey information may also be used for generating benchmarking information used in comparison and/or benchmarking comparison reports.

Further, in at least one of the various embodiments, real-time information such geolocation information, power/energy information, weather information, production information, or the like, or combination thereof may be collected and used in part to generate the benchmarking information.

In at least one of the various embodiments, benchmarking information may be used to generate reports that include comparisons between one or more customer models and the one or more community models. In at least one of the various embodiments, the benchmarking information may be continuously updated based on changes to customer models and/or data, community models and/or data, external information, or the like, or combination thereof. Accordingly, in at least one of the various embodiments, the benchmarking information may provide real-time and/or near real-time comparison information for evaluating the performance of one or more customer models.

Further, in at least one of the various embodiments, resource allocations may be managed using benchmark engines that are separate from the community models. Accordingly, in at least one of the various embodiments, one or more community models maybe generated based on raw model data such that the raw model data is mapped to the one or more community models based on standard models. In at least one of the various embodiments, model items that may be represented with benchmark engines may be determined based on the one or more community models.

In at least one of the various embodiments, one or more benchmark components for each of the plurality of model items may be generated based on benchmark data included in the one or more community models. Also, in at least one of the various embodiments, the benchmark data included in the one or more community models may be modified based on real-time information obtained from one or more of geolocation sensors, weather information sensors, or electrical power sensors.

In at least one of the various embodiments, the one or more benchmark components may be ranked for each of the plurality of model items based on an evaluation of a their contribution to a total cost value of their corresponding model item. In at least one of the various embodiments, ranking the one or more benchmark components may further include, employing best fit analysis, such as, correlation coefficients, goodness of fit, coefficient of determination, chi-squared test, or the like, to evaluate the benchmark components for ranking. Also, in at least one of the various embodiments, generating the benchmarking data may include: determining additional relevant information from one or more external data sources; and modifying the benchmarking data based on the additional relevant information.

Accordingly, in at least one of the various embodiments, one or more benchmark engines for each of the plurality of model items may be generated based on a combination of benchmark components such that the benchmark components may be selected based on their ranking.

In at least one of the various embodiments, if an update to a raw model data value exceeds a threshold, benchmark engines may be re-generated based on the updated raw model data. Also, in at least one of the various embodiments, if a number of community models are added or removed from exceeds a threshold value, the benchmarking engines may be updated based on the added or removed community models.

Also, in at least one of the various embodiments, if an actual data value may be to a benchmark engine of a model item, the benchmark engine may be used to generate a benchmark values for benchmarking the model item.

Illustrative Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")-(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
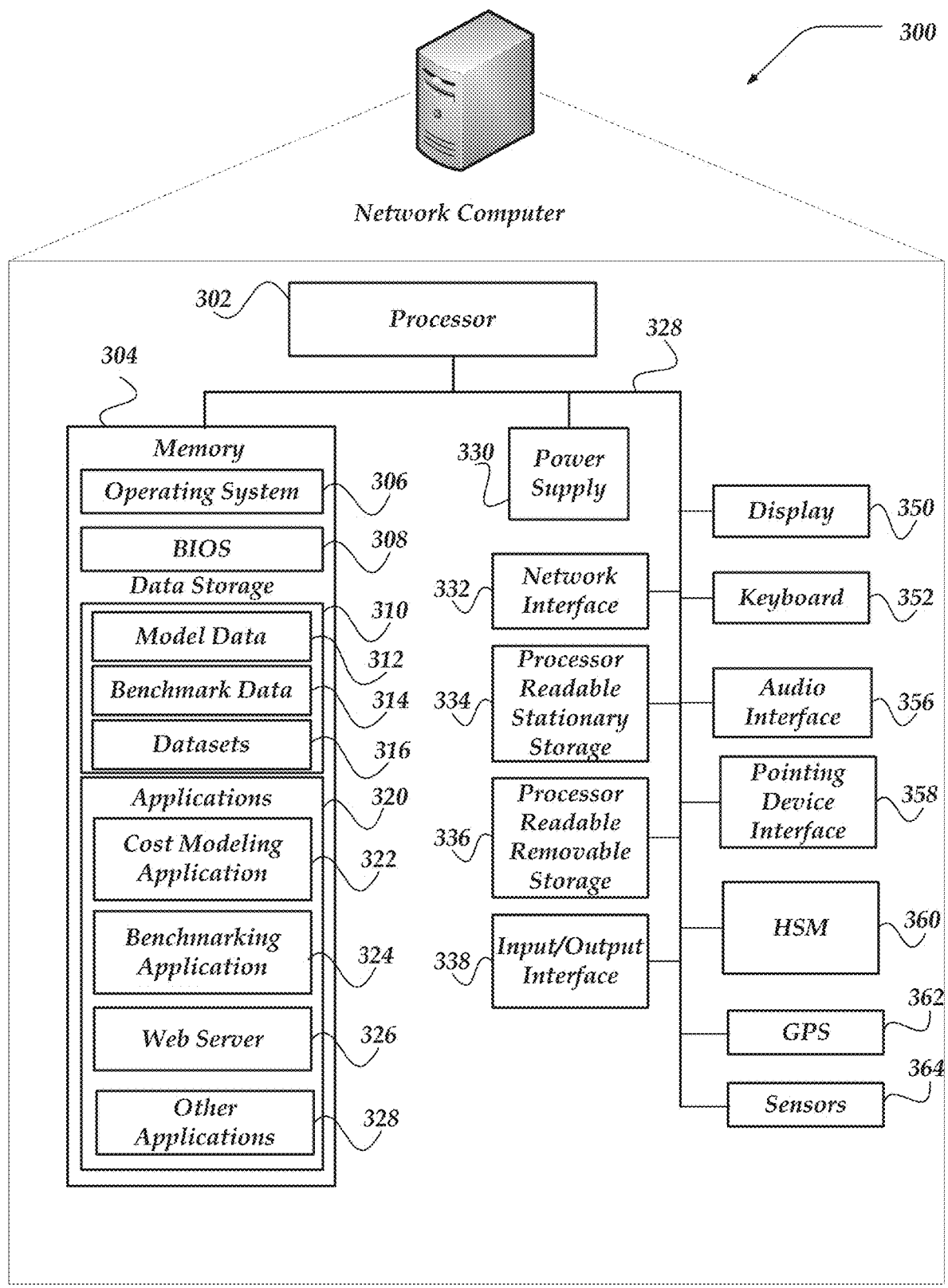
FIG. 3 illustrates one embodiment of a network computer that may be included in a system.

CMP 107 may include virtually any network computer usable to perform data processing operation that may be used for generating cost models, data models, allocation rules, recursive allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, recursive allocation rules or the like. Furthermore, CMP 107 may include and/or generate data processing applications for visualizing the generated allocation categories, cost allocations, budgets, cost models, data models, allocation rules, recursive allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform to at least some of its actions.

Illustrative Client Computer

Figure 2:
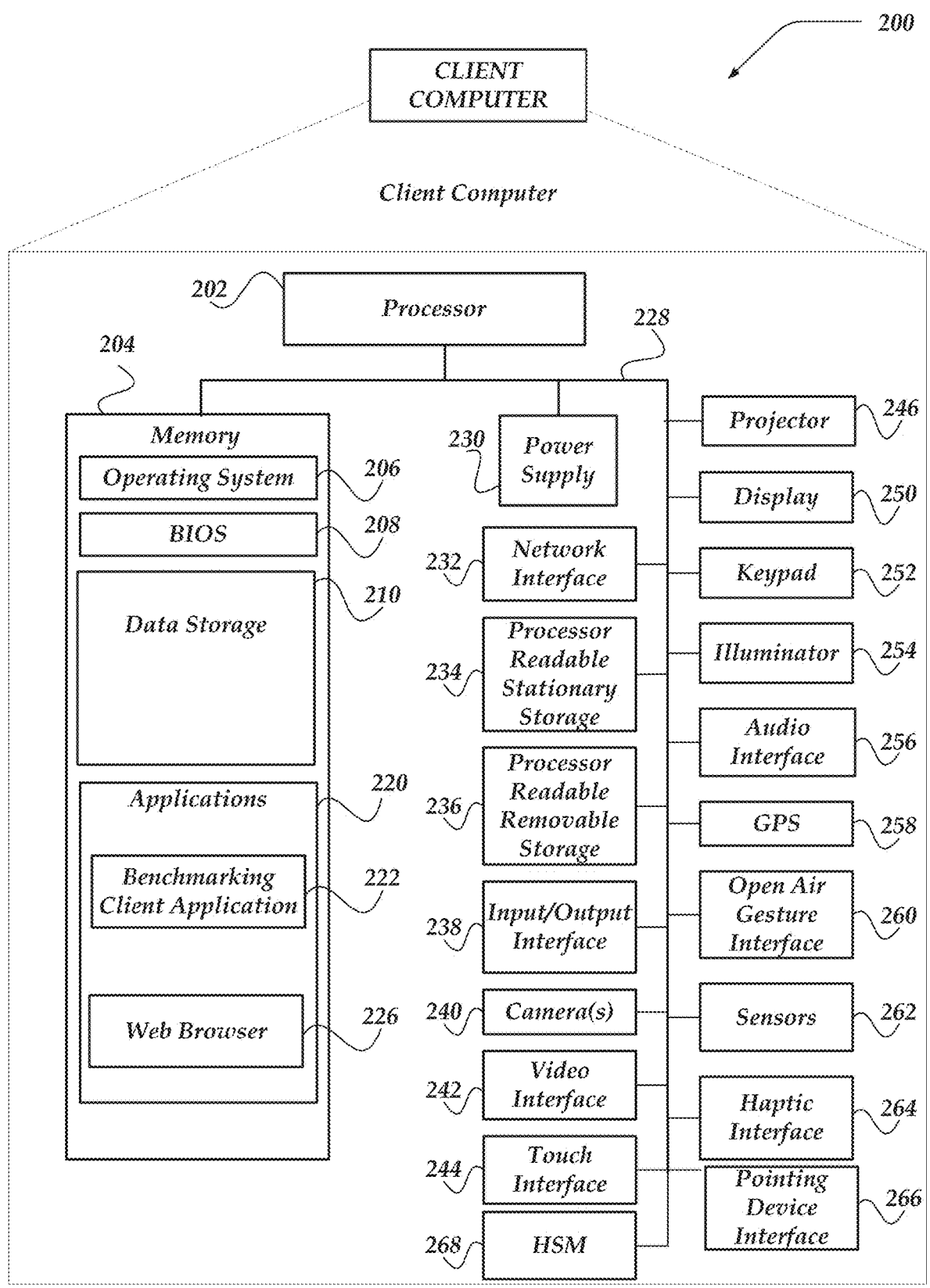
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, benchmarking client application 222. In at least one of the various embodiments, benchmarking client application 222 may be used to exchange communications to and from cost modeling platform server computer 107, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model data 312, benchmark data 314, one or more datasets 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, benchmarking application 324, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocol over the networks, such as, wireless network 108 and/or network 111.

Furthermore, in at least one of the various embodiments, cost modeling application 322 and/or benchmarking application 324 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to modeling application 322 and/or benchmarking application 324 may be provisioned and de-commissioned automatically.

Also, in at least one of the various embodiments, modeling application 322, benchmarking application 324, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, recursive allocation, data model, cost models, total cost values for offerings, reports, or the like. Also in at least one of the various embodiments, modeling application 322 and/or benchmarking application 324 may employ processes, or parts of processes, similar to those described below.

Illustrative Logical System Architecture

FIGS. 4-9 are presented to illustrate logical architectures at least one of the various embodiments for infrastructure benchmarking based on dynamic cost modeling.

Figure 4:
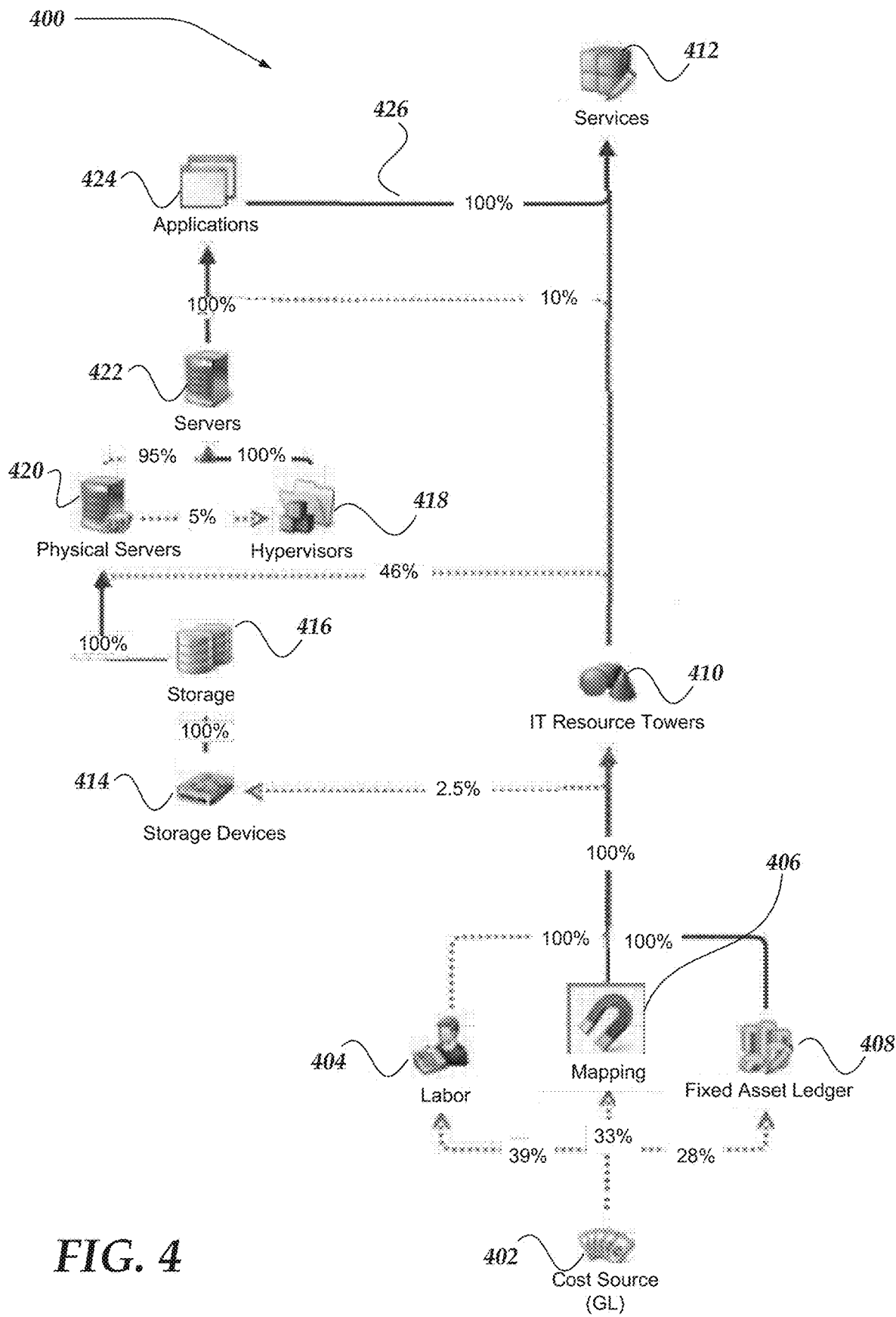
FIG. 4 shows one embodiment of a model for automatically generated business system.

FIG. 4 shows, for at least one of the various embodiments model 400 that may be generated using cost modeling platform (CMP) server computer 107. In at least one of the various embodiments, in this example, model 400 represents a business system and starts with costs flowing from cost source 402, which may be a general ledger (GL) or other type of financial data. In this model, cost source 402 flows to labor 404, fixed asset 408, and to category mapping 406.

In at least one of the various embodiments, in model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being model.

In at least one of the various embodiments, model 400 shows that 100% of costs flow to IT resource tower 410. From IT resource tower 410 costs flow to services 412. Thus, for this business system, model 400 shows that all the costs are allocated to producing the service offerings that the modeled business organization provides.

In at least one of the various embodiments, the budget and forecasting application may further enable users to gain additional understanding of how the costs from cost source 402 flow through the entire system. Model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, model 400 shows that physical servers 420 are burdened by 100% of the costs of storage 416. And, since the business organization modeled by model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

Figure 5:
FIG. 5 illustrates a table that may include dataset information.

FIG. 5 shows table 500 that may include information related to datasets that may be used by budget and forecasting platform 107 for generating business systems and data models. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided as one or more, XML files, comma separated files, directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to budget and forecasting platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
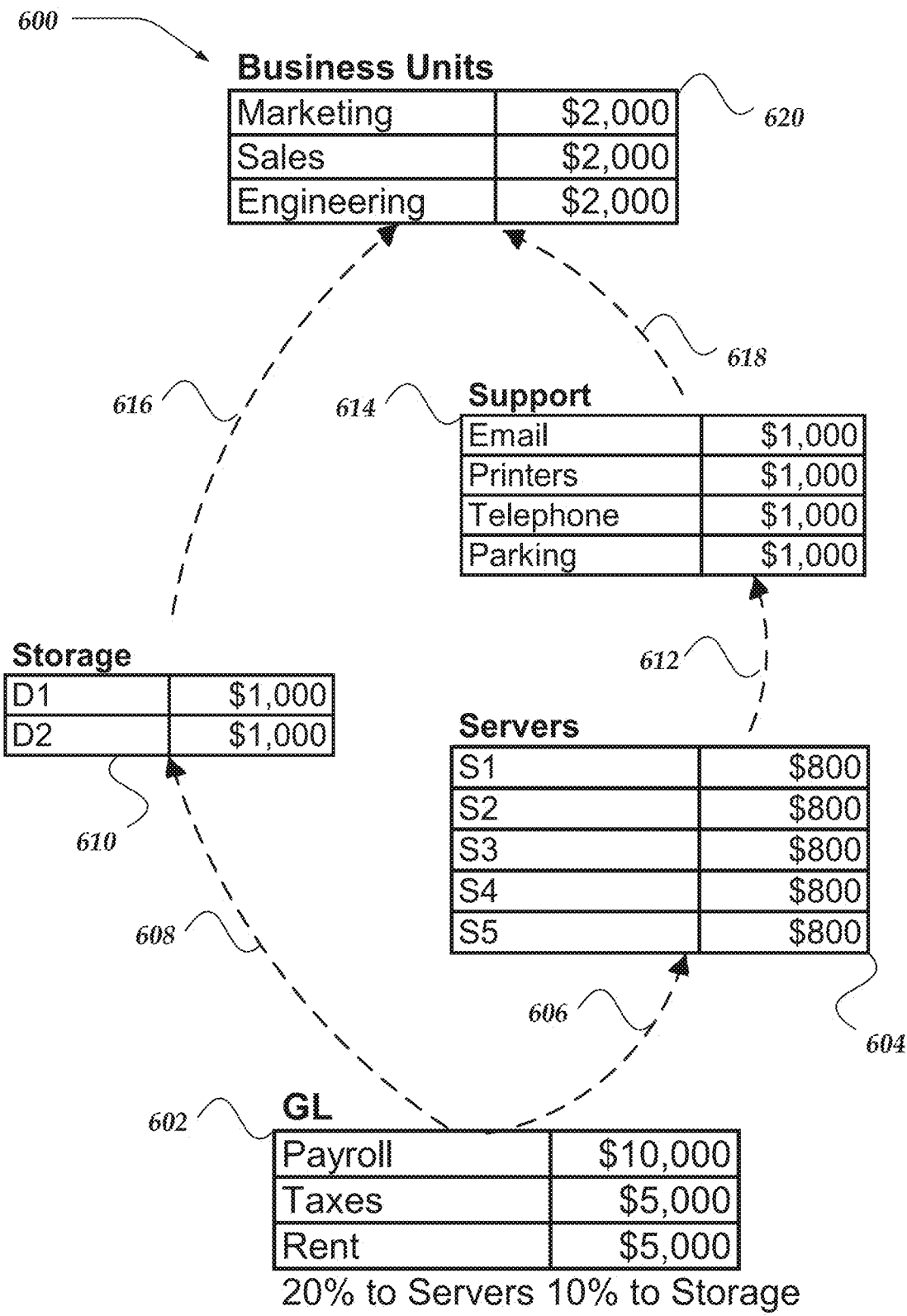
FIG. 6 shows a logical architecture of a model for an automatically generated business system.

FIG. 6 illustrates a portion of a logical architecture for model 600 that may be enabled by at least one of the various embodiments.

In at least one of the various embodiments, the model 600 may have five categories: GL 602, Servers 604, Storage 610, Support 614, and Business Units 620. In at least one of the various embodiments, each category contains a set of cost line items. For example, GL 602 includes cost line items for Payroll, Taxes and Rent. Likewise, Support 614 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may be used to connect categories and/or objects of model 600. In at least one of the various embodiments, allocation rules may show how costs (money) flow between the categories. Resulting in a graph where the categories may be represented as nodes and the allocation rules may be represented as edges. In at least one of the various embodiments, generally a model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 (source object) to Servers category 604 (target object). In this example, GL 602 includes a total of $20,000, thus 20% of $20,000 (e.g., $4,000) flows based on allocation rule 606 to Servers 604. Likewise, allocation rule 608 may allocate $2,000 from GL 602 to Storage 610. The other allocation rules in model 600 allocate 100% of the money to the next category: allocation rule 612 directs 100% of the money (e.g., $4,000) to flow to Support 614; allocation rule 618 directs 100% of the money in Support (e.g., $4,000) to flow to Business Units 620; and allocation rule 616 directs 100% of the money from Storage 610 to flow to Business Units 620.

In at least one of the various embodiments, money that flows into the category may be allocated among the included cost line items. In at least one of the various embodiments, each category may have one or more rules that may describe the assignment ratios for how the money in a category may be assigned to cost line items. For the categories 604, 610, 614, and 620, simple allocation rules assign the money in the category evenly among the cost line items comprising each category. GL 602 may have different assignment ratios, in this non-limiting example, the assignment ratio between the cost line items may be 50% to Payroll, 25% to Taxes, and 25% to Rent.

In at least one of the various embodiments, an assignment ratio may represent how the money in an actual budget may be assigned to the actual cost line items. In at least one of the various embodiments, rules may be applied that distribute the money based on formulas that may be defined by the users or administrators who designed the model. In at least one of the various embodiments, the assignment ratios and allocations may be modified as part of the modeling process.

The model 600 is a simplified model useful for facilitating discussion and understanding of the embodiments, since allocation rules for models of large commercial entities can be numerous and complex. However, model 600 is at least sufficient to enable one of ordinary skill in the art to practice what is claimed herein.

Figure 7:
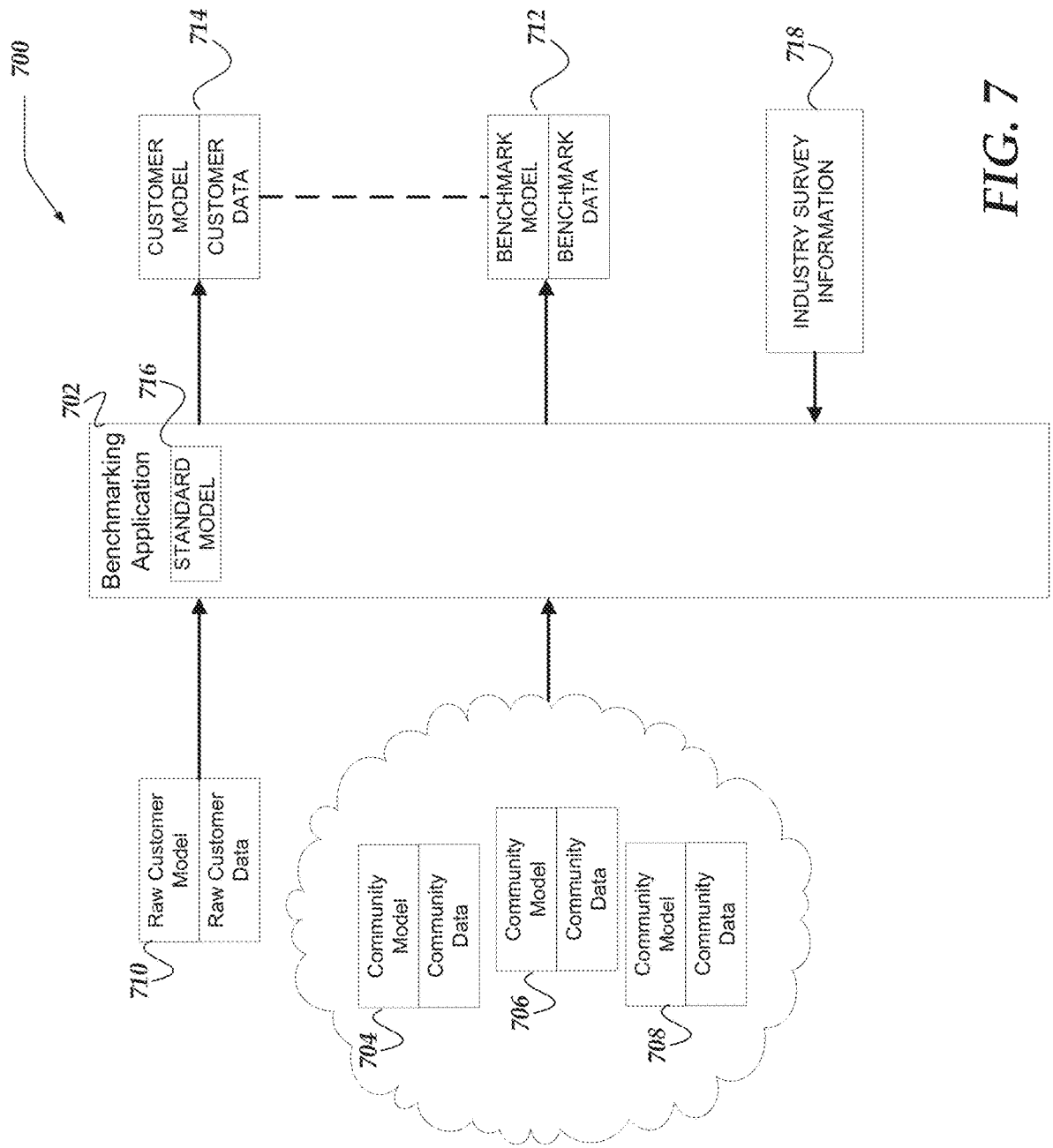
FIG. 7 shows a portion of a data model in accordance with at least one of the various embodiments.

FIG. 7 shows a portion of a logical architecture for benchmarking system 700 that performs actions in accordance with at least one of the various embodiments. In at least one of the various embodiments, benchmarking application 702 may be a representation of benchmarking application 324. In at least one of the various embodiments, benchmarking application 702 may be arranged to perform actions to generate benchmarking information based on one or more models, such as, cost model 600. In some embodiments, the models may be associated with financial activity/performance for one or more customers and/or entities. Typically, the customers may be separate enterprises, companies, departments within an enterprise, or the like. In some cases, customers may have more than one model for modeling different parts of their business or for performing different types of analyses, and so on.

Accordingly, in at least one of the various embodiments, system 700 may include, one or more (e.g., up to thousands) of community models, such as community model 704, community model 706, community model 708, and so on.

Herein, community models are described separately to distinguish them for one or more particular customer models of interest. Accordingly, community models may considered models for other customers. Thus, each community model may be considered a customer model or a community model depending on the context.

In at least one of the various embodiments, customers may have one or more raw customer models, such as, raw customer model 710 that models one or more systems (e.g., financial systems). In this context, the model is considered a raw model because the model may not map closely to a template model and/or a benchmark model. For example, the raw customer model may have sub-elements that are grouped and/or named using a taxonomy that is different than one used by another "standard" model, standard model 716.

In at least one of the various embodiments, the raw customer model referred to a model because of its structural/logical representation of the raw customer data. In some embodiments, raw customer models may be complex models generated by a cost modeling platform (CMP) or the like. In other cases, raw customer models may be as simple as a spreadsheet, an XML file, comma separated file, or the like. In some embodiments, the raw customer model represents a model generated and/or designed for another system. In other embodiments, the raw customer model may be a model generated by a CMP.

In at least one of the various embodiments, a benchmarking application, such as benchmarking application 702 may include a mapping engine that maps raw customer models to one or more standard models. For example, the mapping engine may be arranged to may a given raw customer model to one or more selected standard models, such as, standard model 716.

In at least one of the various embodiments, customer model 714 represents a model that is generated based on mapping the elements of a raw customer model to another model. In some embodiments, the customer model may be very similar to an original raw customer model. The variance depends on the deviation between the raw customer model and the standard model that provides the basis for the customer model. In some cases, the raw customer model may have been generated based on the same standard model associated with the customer model. Thus, in these cases, the raw customer model may be the same or similar as the customer model. In other cases, the raw customer model may deviate significantly from the standard model used for the customer model. In any case, the mapping engine included in the benchmarking application may be arranged to perform the necessary mappings and/or transformations to generate customer models, such as, customer model 714, for raw customer models, such as raw customer model 710, using a standard model, such as standard model 716.

In at least one of the various embodiments, the benchmarking application may employ various techniques to determine which of a plurality of standard models may be applicable to given raw customer model. In at least one of the various embodiments, the machine learning may be used to generate one or more classifiers for classifier a given raw customer model as being appropriate for a particular standard model. In other cases, rule based configuration information may employed select a standard model. Further, in some embodiments, a user may select a standard model. In some cases, the benchmarking application may employ some or all of the above techniques to recommend a standard model that may be confirmed/accepted by a user.

Similarly, in at least one of the various embodiments, benchmarking application 702 may employ various techniques for determining how elements in a raw customer model are mapped and/or transformed to elements that fit the selected standard model to generate the appropriate customer model.

In at least one of the various embodiments, information discovered by analyzing one or more of community models may employed for selecting an appropriate standard model and/or performing the mapping and transformation. For example, in at least one of the various embodiments, correlations between the raw community models and the community models may be used in part for determining which standard model to select and/or recommend for a new or incoming raw customer model. For example, an incoming raw customer model may be similar to one or more previously seen raw models (e.g., raw community models). Thus, standard models selected for these previously seen raw models may be also selected/recommend for the incoming raw customer models.

In at least one of the various embodiments, benchmarking application 702 may be arranged to process the data associated with one or more of the community models to produce one or more benchmark models. In at least one of the various embodiments, benchmark models may have the same or similar elements as the one or more standard models that were used to generate the community models. However, the data values (e.g., benchmark data) may be computed based on the actual values of the community data associated with the community models. In at least one of the various embodiments, benchmark values may be means, medians, histograms, curves, or the like, that are generated from community data that is associated with one or more community models.

In at least one of the various embodiments, information from a benchmark model, such as, benchmark model 712, may be compared with information included in a customer model. Accordingly, the customer may be enabled to compare the performance of the system represented by the customer model to one or more benchmark values. In at least one of the various embodiments, benchmark comparison information may be presented using various report formats and presentations. In some embodiments, reports may be interactive such that they enable a user to drill-down or otherwise navigate through the customer models.

Further, in at least one of the various embodiments, reports may be arranged to highlight or emphasize outlier values to bring them to attention of users. Also, in at least one of the various embodiments, comparison of benchmark information and/or a benchmark model to a customer model may trigger one or more notifications based on rules, configurations, or the like, or combination thereof. For example, in at least one of the various embodiments, if the variance between a data value in a customer model and its corresponding value in a benchmark model exceeds a defined threshold, a notification message may be generated to bring this condition to the attention of one or more users.

In at least one of the various embodiments, industry survey information, such as, industry survey information 718, may be employed in addition to using community model information to generate benchmark information. In at least one of the various embodiments, industry survey information may include curated information provided by one or more external/third-party sources of industry practices. Also, in at least one of the various embodiments, industry survey information 718 may include real-time and/or near real-time information streams that include information, such as, pricing data, energy costs, or the like.

In at least one of the various embodiments, models, model data (raw, customer, community, benchmark, or otherwise), industry survey information, or the like, may be stored locally, remotely, in a cloud environment, or the like, or combination thereof. Also, each model in system 700 may be associated with data representing the values for a particular enterprise or customer (shown in FIG. 7 but not numbered explicitly).

Figure 8:
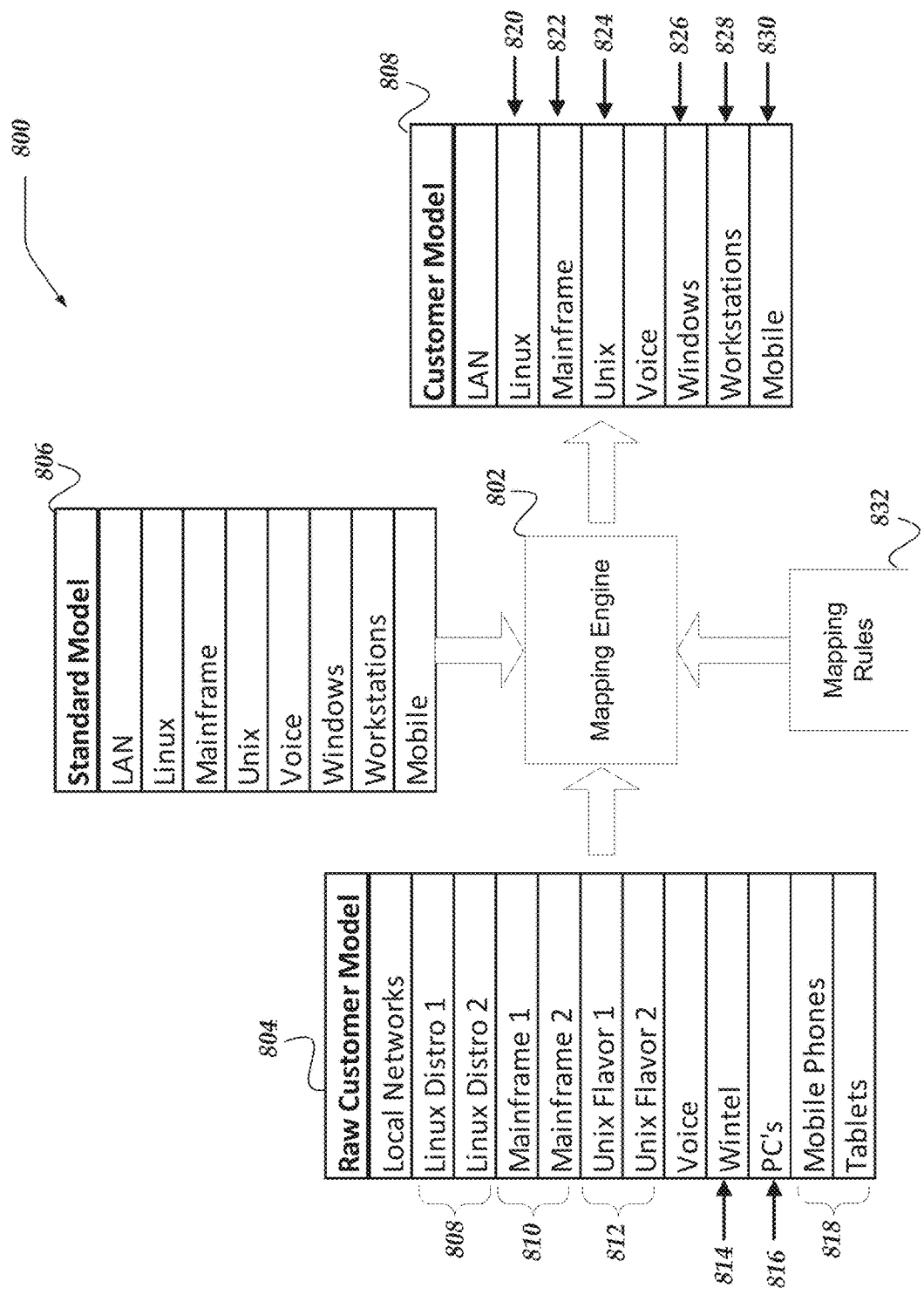
FIG. 8 shows a portion of a logical architecture for a benchmarking system that performs actions in accordance with at least one of the various embodiments.

FIG. 8 shows a portion of a logical architecture for benchmarking system 800 that performs actions in accordance with at least one of the various embodiments. In at least one of the various embodiments, a benchmarking system, such as, system 800, may include a mapping engine, such as, mapping engine 802. In at least one of the various embodiments, mapping engine 802 may be incorporated in a benchmark application, such as, benchmarking application 324. In at least one of the various embodiments, a benchmarking system may also include one or more raw customer models, such as, raw customer model 804; one or more standard models, such as, standard model 806; one or more customer models, such as, customer model 808; or the like.

In at least one of the various embodiments, as introduced above, mapping engine 802 may be arranged to map raw customer models onto customer models based on a standard model. In this example, raw customer model 804 is mapped to customer model 808 using standard model 806.

In this non-limiting example, raw customer model 804 includes two elements, elements 808 (e.g., Linux Distro 1 and Linux Distro 2) that represent two different types of operating system versions (e.g, Linux Distributions) that may be used in an enterprise. In this example, raw customer model 804 has one element per type of Linux distributions. Likewise, in this example, elements 810 represent elements for two different types of mainframe computers; elements 812 represents two type of Unix versions; element 814 represents a desktop operating system; element 816, represent desktop computers; and elements 818, represent two kinds of mobile computers (e.g., tablet computers and mobile phones In this example, standard model 806 is being used to generate customer model 808 from raw customer model 804. However, standard model 806 has similar but not exact elements as raw customer model 804. Accordingly, in at least one of the various embodiments, mapping engine 802 may be arranged to perform the mappings and transformations to generate customer model 808 from raw customer model 804 and standard model 806.

In at least one of the various embodiments, one or more rules, scripts, custom circuitry (e.g., ASICs, FPGAs, or the like), configuration information, programs, or the like, or combination thereof, may be employed by mapping engine 802 to perform the necessary transformations to generate a customer model from a raw customer model. Also, in at least one of the various embodiments, a user graphical user interface may be generated and provided to enable a user to participate directly or indirectly in the mapping process. For example, in some cases, mapping engine 802 may be unable to automatically determine how one or elements of a raw customer model should be mapped into a customer model. Accordingly, in at least one of the various embodiments, a user interface may be generated that enable one or more users to perform some or all of the mapping process.

In at least one of the various embodiments, elements in a customer model may represent one or more elements from a corresponding raw customer model. In this example, element 820 represents all of the Linux servers for this customer. Accordingly, in this example, element 820 may be an aggregation of the values of elements 808 of raw customer model 804. Likewise, in this example, element 822 in customer model 808 may be an aggregation of elements 810; element 824 in customer model 808 may be an aggregation of elements 812; and element 830 in customer model 808 may be an aggregation of elements 818.

Further, in this example, mapping engine 802 has mapped element 814 in raw customer model 804 to element 826 in customer model 808; and mapped element 816 in raw customer model 804 to element 828 in customer model 808.

FIG. 9 illustrates a logical representation of benchmark comparison table 900 that is in accordance with at least one of the various embodiments. In at least one of the various embodiments, a benchmark comparison, such as, table 900 may include various columns, such as, sub-towers 902, customer actuals 904, benchmark values 906, delta values 908, or the like. In at least one of the various embodiments, sub-towers 902 indicate the name or description of an element in a customer model. Customer actuals 904 represents the actual value associated with an element of a customer model. Benchmark values 906 represents the benchmark value that have been computed by the benchmarking application. And, delta 908, shows the difference between customer actuals 904 and benchmark values 906. In this example, delta 908 represents a percentage value computed by taking the difference of a customer actuals value and its corresponding benchmark value and dividing this difference by the corresponding benchmark value. One of ordinary skill in the art will appreciate the table 900 may be implement using various data structures and/or formats, including, linked lists, arrays, database tables, comma-separated-value (CSV) files, or the like, or combination thereof. Also, a benchmark comparison table may have more or less columns than table 900. For example, a benchmark comparison table might not include a column such as delta 908. Likewise, for example, a benchmark comparison table may include additional columns, such as, standard deviations, min-max values for the benchmark values, mean of benchmark values, median of benchmark values, or the like.

In at least one of the various embodiments, a benchmark comparison table, such as table 900 may be employed to review how closely a customer model may be following a benchmark. For example, in this example, the customer actuals of money going toward Linux is 300% more than the Linux benchmark value. See, table 900, row 910. Likewise, in this example, the customer is spending 80% less on Windows that the benchmark value. See, table 900, row 912. The benchmark comparison information enables a customer to quantitatively ascertain how their own enterprise is performing compared to other enterprises. In this example, the customer may be alerted to the fact that they are spending far more on Linux servers than other customers.

In some embodiments, significant deviations from benchmark value may indicate that a benchmark model may need to be refined/revised, or the community models selected to contribute to a set of benchmark values may need to be modified.

Generalized Benchmarking Operations

FIGS. 10-13 represent the generalized infrastructure benchmarking based on dynamic cost modeling in accordance with at least one of the various embodiments. In at least one of the various embodiments, processes 1000, 1100, 1200, and 1300 described in conjunction with FIGS. 10-13 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 10-13 may be operative in cost modeling and benchmarking architectures such as those described in conjunction with FIGS. 4-9.

Figure 10:
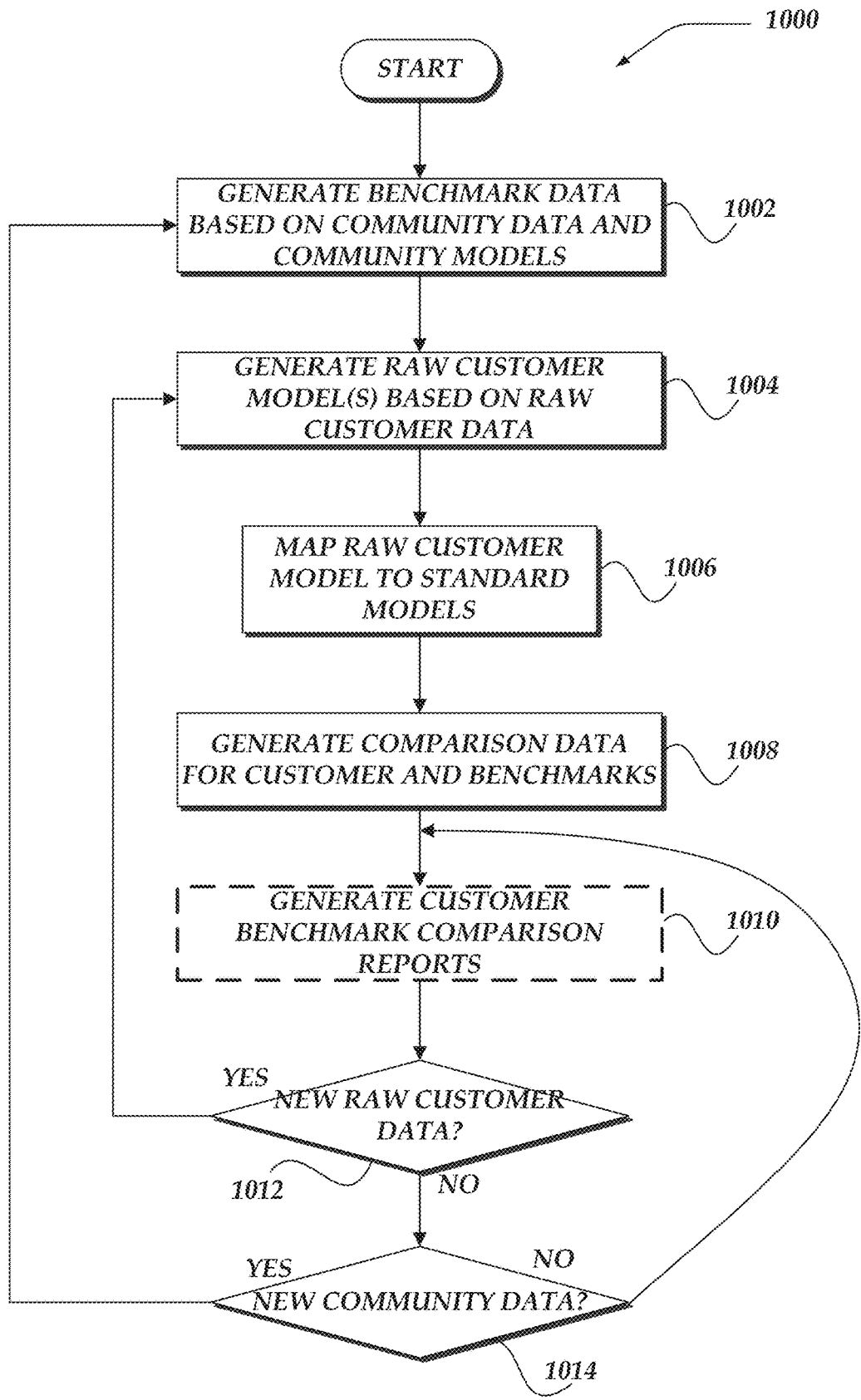
FIG. 10 illustrates a flowchart for a process for infrastructure benchmarking based on dynamic cost modeling in accordance with at least one of the various embodiments.

FIG. 10 illustrates a flowchart for process 1000 for infrastructure benchmarking based on dynamic cost modeling in accordance with at least one of the various embodiments. After a start block, at block 1002, in at least one of the various embodiments, benchmark data may be generated based on community models and associated community data.

At block 1004, in at least one of the various embodiments, raw customer models may be generated based on raw customer data. In at least one of the various embodiments, raw customer models may be generated by consuming data that includes information about a customer's enterprise and operations. In at least one of the various embodiments, if the benchmarking application is arranged to benchmark information technology spending, the customer data may be structured or unstructured information describing the customer's IT assets, expenses, or the like.

At block 1006, in at least one of the various embodiments, the benchmarking application may map the raw customer models to one or more standard models. In at least one of the various embodiments, the raw customer model may be arranged based on how the customer had organized its raw data. Accordingly, the raw customer model may not be organized to be conducive to making comparison with other customer models (e.g., community models). Thus, in at least one of the various embodiments, a mapping engine may execute mapping and transformations to generate a customer model that conforms to one or more standard models.

At block 1008, in at least one of the various embodiments, benchmarking comparison data may be generated to compare the customer model values and with benchmark values. See, FIG. 13.

At block 1010, in at least one of the various embodiments, optionally, one or more benchmark comparison reports may be generated and/or provided to users. In at least one of the various embodiments, benchmark comparison reports may include tables, charts, graphs, or the like, or combination thereof, that describe how one or more customer models compare to one or more benchmark models.

In at least one of the various embodiments, the benchmark comparison reports may be interactive and presented in a graphical user-interface. In some embodiments, interactive reports may enable user to dynamically navigate to different elements of the model (drilldown) and/or view different visualizations (tables, charts, and so on) of the benchmark comparisons.

In at least one of the various embodiments, this block may be considered optional because in some embodiments reports may be selectively generated rather than generated all of the time.

At decision block 1012, in at least one of the various embodiments, if there may be new and/or updated raw customer data, control may loop back to block 1004; otherwise, control may flow to decision block 1014. In at least one of the various embodiments, customers may provide updated raw customer data to in response to changes, such as, changes to their enterprise, refinements, corrections, or the like, or combination thereof. In some embodiments, portions of the raw customer data may include streaming information that may be provided in real-time or near real-time (e.g., sales information, price changes, inventory/assets updates, or the like). In any event, in some embodiments, changes/modifications to the raw customer data may be incorporated into the benchmarking system to update the customer model and the benchmark comparison information.

At decision block 1014, in at least one of the various embodiments, if there is new/updated community data, control may loop back to block 1002; otherwise, control may loop back to block 1010. In some embodiments, similar to as described above, changes to the relevant community data and/or community models may trigger the benchmarking information to be re-generated to account for the new/changed information. Otherwise, the system may wait for user requests to generate reports and/or if model/data changes occur.

Figure 11:
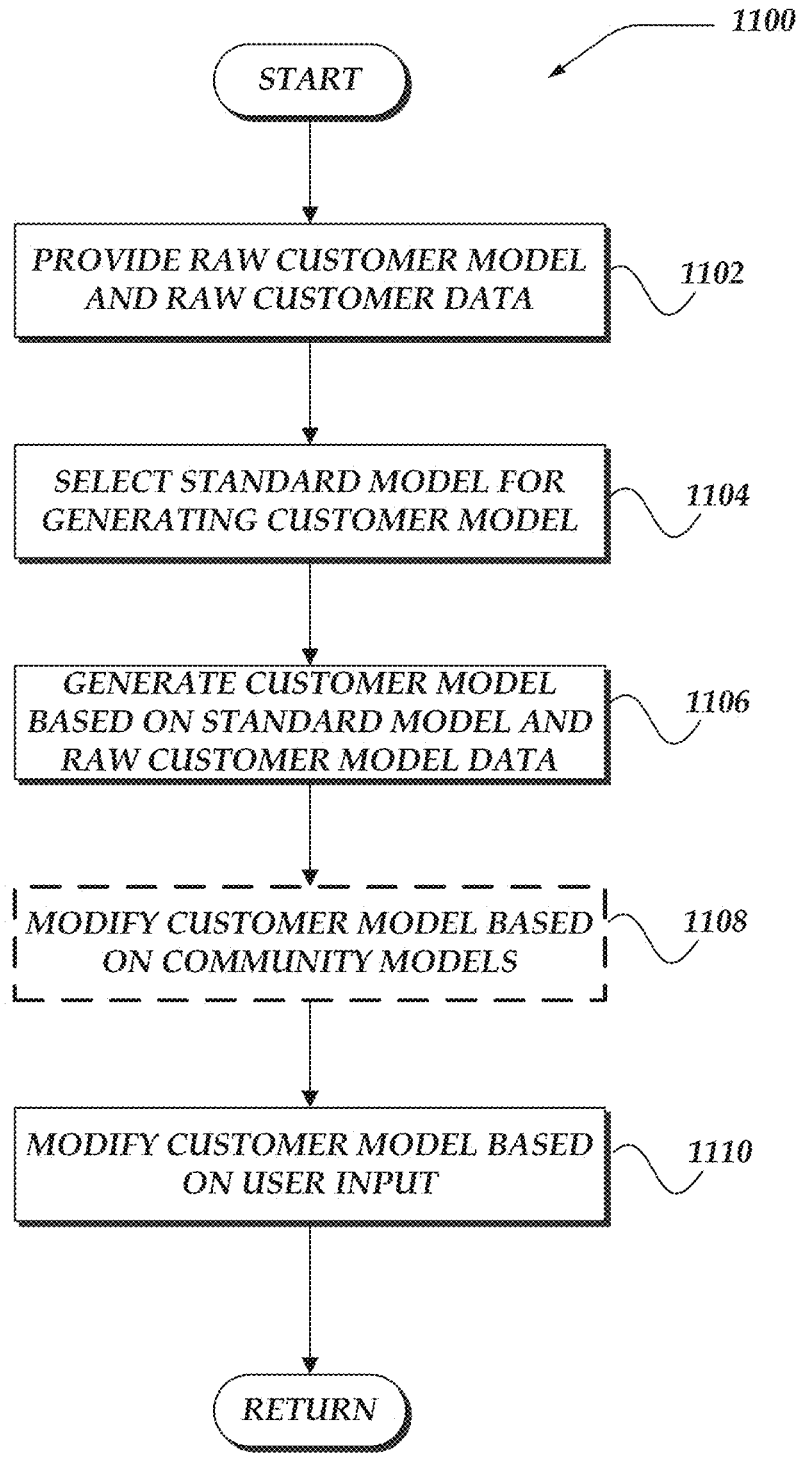
FIG. 11 illustrates an overview flowchart for a process that generates a customer model for infrastructure benchmarking in accordance with at least one of the various embodiments.

FIG. 11 illustrates an overview flowchart for process 1100 that generates a customer model for infrastructure benchmarking in accordance with at least one of the various embodiments. After a start block, at block 1102, in at least one of the various embodiments, raw customer model and raw customer data may be provided to a benchmarking application, such as, benchmarking application 324. As described above, raw customer models and their corresponding data may be provided in various formats. In simple cases, raw customer models may be spreadsheets, database table information, csv files, or the like. In other cases, raw customer models may be structured XML files, models from one or more cost modeling systems, or the like. In at least one of the various embodiments, the benchmarking application may be arranged to have one or more ingestion components to process/parse the provided raw customer information (models and data). In at least one of the various embodiments, a plugin architecture may be used to enable users to provide customized components that perform the actions required for ingesting a given raw customer model and its data.

At block 1104, in at least one of the various embodiments, a standard model may be selected for generating a customer model. In at least one of the various embodiments, there may be one or more standard models that are available. Accordingly, in at least one of the various embodiments, the benchmarking application may be arranged to compare the raw customer information with the available standard models to select a standard model. In some embodiments, users may provide input to influence which standard model is selected.

In at least one of the various embodiments, standard models may be used as templates to define how to map raw customer models to customer models.

At block 1106, in at least one of the various embodiments, a customer model may be generated based on the selected standard model, the raw customer model, and the raw customer data. In at least one of the various embodiments, a mapping engine components included in a benchmarking application may be arranged to map one or more elements of the raw customer model to a customer model based on the selected standard model. In at least one of the various embodiments, the mapping engine may employ rules, configurations, machine learned classifiers, or the like, to determine how elements in the raw customer model are mapped and/or transformed into a customer model.

At block 1108, in at least one of the various embodiments, optionally, the customer model may be modified and/or revised based on information determined from the community models. In at least one of the various embodiments, the mapping of raw customer models into customer models may be influenced one or more community models.

In some embodiments, one or more community models may be explored to determine if they have elements in common with the customer model. Or, if their corresponding raw customer model is similar to the raw customer model of the customer model that is being processed. Accordingly, similarities may be exploited to provide information the mapping engine. In some embodiments, if the raw customer model of an incoming customer is similar or the same as raw customer models corresponding to one or more community models, the mapping engine may execute mapping actions similar to actions performed on the community models having the similar or same raw customer models.

For example, if a review of community models shows that raw customer model elements named "Linux Distro X" are mapped to "Server Operating Systems" rather than "Linux", the mapping engine may deviate from an otherwise standard model accordingly. This is advantageous because it enables the mapping engine to learn from previous modifications to a standard model rather than requiring a user to manually customize the customer model.

At block 1110, in at least one of the various embodiments, the customer model may be further modified based on user input. In at least one of the various embodiments, at almost any time in the process of ingesting raw customer models, a user may intervene in the process. In some embodiments, a user may select the standard model user for generating the customer model. Also, a user may modify the mapping such that the generated customer model deviates from the standard model. Accordingly, in cases where the mapping engine has incorrectly mapped a raw customer model element to a customer model element, a user may be enabled to step in a correct the mistake.

In at least one of the various embodiments, a graphical user interface may be generated that enables the user manipulate the elements of a customer model and its mapping. In some embodiments, the user may be enabled to modifying the mapping rules/configuration that are used by the mapping engine.

In at least one of the various embodiments, the changes made to a customer model by a user may be recorded by the mapping engine. Accordingly, the mapping engine may be arranged to automatically perform a user's actions if similar raw customer models are encountered and/or similar standard models are selected for generating customer models.

Figure 12:
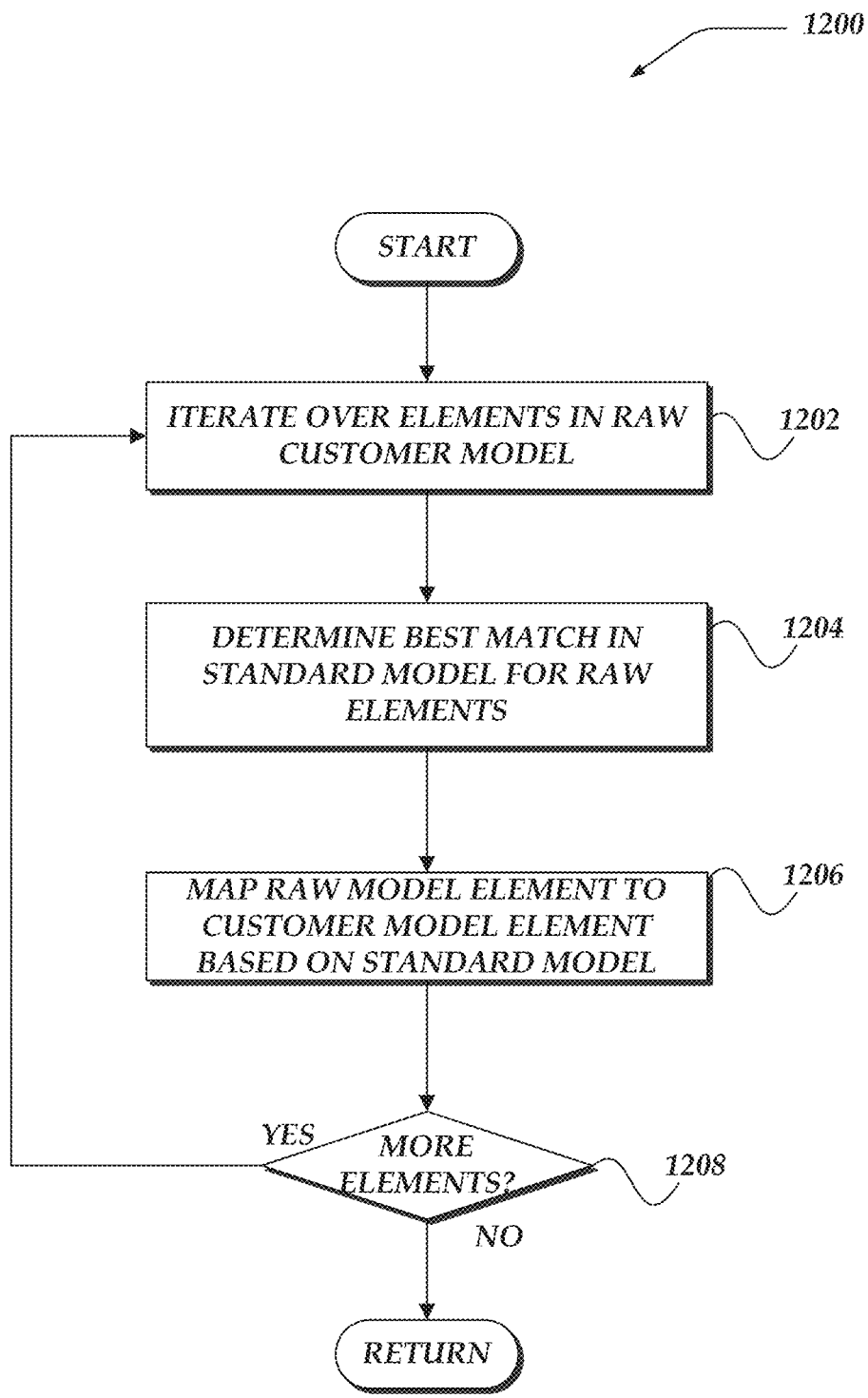
FIG. 12 illustrates a flowchart for a process for mapping raw customer model elements to a customer model in accordance with at least one of the various embodiments.

FIG. 12 illustrates a flowchart for process 1200 for mapping raw customer model elements to a customer model in accordance with at least one of the various embodiments. After at start block, at block 1202, a mapping engine, such as, a mapping engine in benchmarking application 324, may begin iterating over the elements of a raw customer model.

In at least one of the various embodiments, a raw customer model may be a data structure that contains the raw customer data for a customer is being added to a modeling system, such as, cost modeling application 322. In at least one of the various embodiments, the raw customer model may comprised of structured of unstructured data that described the items being modeled. In some embodiments, a raw customer model may be akin to an inventory list of assets, quantities, values, and so on. In other cases, the raw customer model may be complicated tree or graph representation, including models such as those described in FIGS. 4-6.

Further, in at least one of the various embodiments, a raw customer model may be the product of one or more upstream processes employed to pre-process the information before providing it to a cost modeling application and/or benchmarking application.

At block 1204, in at least one of the various embodiments, the best matching element in the standard model may be determined. In at least one of the various embodiments, the mapping engine may be arranged to parse a raw customer model to determine its various sub-components (e.g., elements) and their relationships. In some cases, the relationships may be explicitly described in the raw customer model based on its structure. For example, if the raw customer model is defined by a SQL database dump file, there may be relationship information explicitly included in the raw customer model and its data that may be used by mapping engine.

In other cases, the mapping engine may infer relationships based shared fields in the elements, or the like. For example, if the raw customer model is based on multiple CSV or text files, the mapping engine may employ pattern matching to identify potential relationships based on identifiers/key values that may be included in the text files.

In at least one of the various embodiments, mapping engine may employ one or more matching techniques to determine one or more best matches in the standard model. In some embodiments, there may be more the one element of the standard model that considered to the match the raw customer model element that is being considered. In such cases, in some embodiments, the standard model elements may organized into a list and ranked based on how close they match the current raw customer model. For example, a machine learning based classifier system used by the mapping engine may generate confidence scores that correspond to how close the raw customer elements match the standard model elements. Thus, in this example, if the scores for more than one standard customer model elements fall within a defined threshold value, those standard customer model elements may be selected.

At block 1206, in at least one of the various embodiments, the raw customer model element may be mapped to a customer model element based on the matched standard model element. In at least one of the various embodiments, if multiple standard model elements were matched, the mapping engine may be arranged to select one of the multiple matches using one or more techniques, such as, taking the highest scored element, presenting a selection list to a user, or the like.

At decision block 1208, in at least one of the various embodiments, if there are more elements that need mapping, control may loop back to block 1202; otherwise, control may be returned to a calling process. Note, in at least one of the various embodiments, there may be some elements in the raw customer model that may be determined to be unable to map using the selected standard model. In some embodiments, such elements may be mapped to an element in the customer model that captures unmapped elements. Thus, the customer model will still track those "unmapped" elements. Also, in some embodiments, a user may be enabled to go in a map the elements manually if desired.

Figure 13:
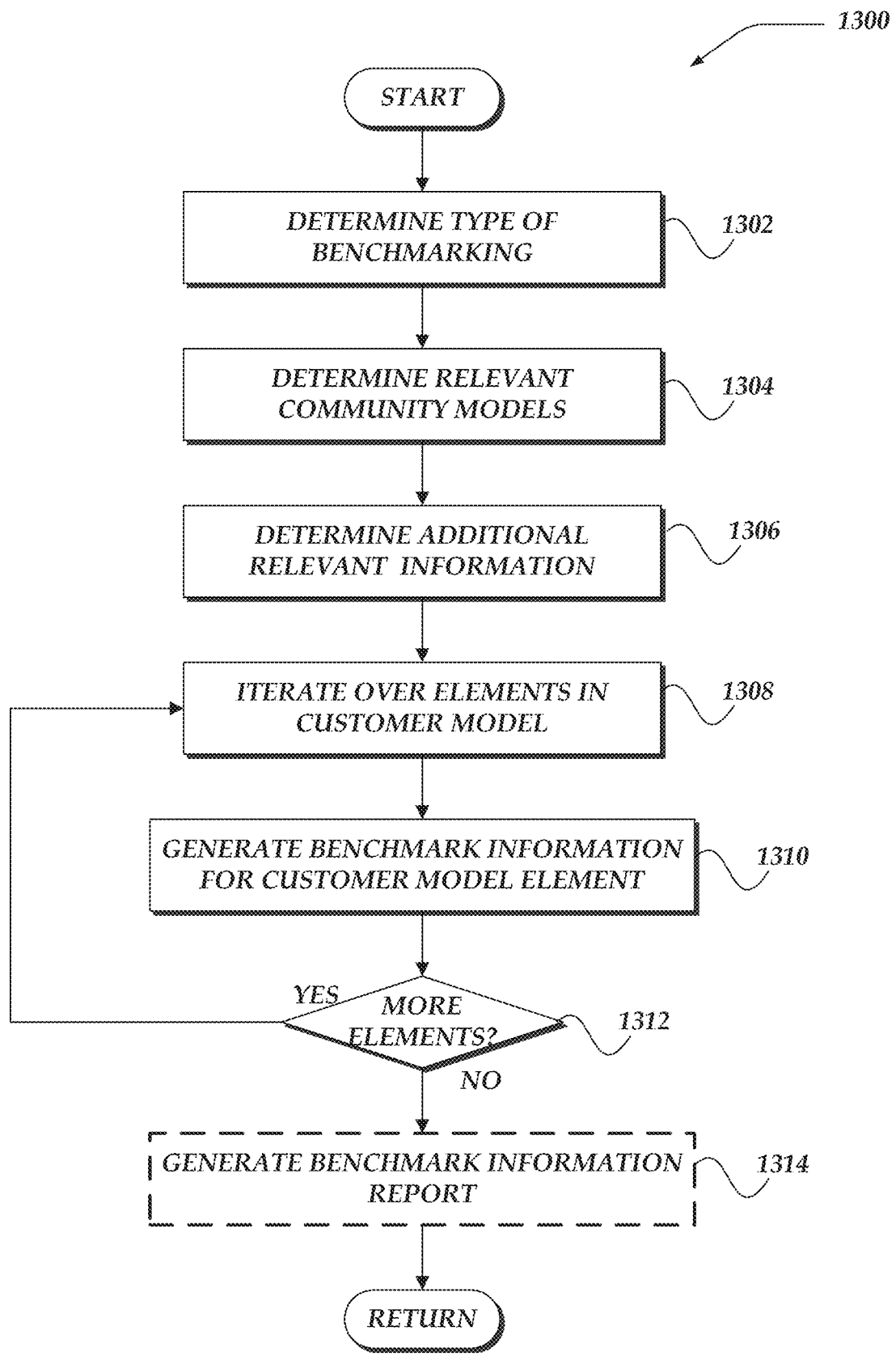
FIG. 13 illustrates a flowchart for a process for generating benchmarking information in accordance with at least one of the various embodiments.

FIG. 13 illustrates a flowchart for process 1300 for generating benchmarking information in accordance with at least one of the various embodiments. After a start block, at block 1302, in at least one of the various embodiments, the type of benchmarking may be determined.

In at least one of the various embodiments, as discussed above, there may be different types of benchmarking processes directed for different purposes and/or industries. Also, in at least one of the various embodiments, benchmarking types may be focused on different sources of information for comparison. In some embodiments, benchmarking may be based on comparisons with other parts within the same enterprise (e.g., different departments in the same company, or the like).

In at least one of the various embodiments, benchmarking may be targeted at different types of analysis, such as, financial, manufacturing, shipping, human resources, or the like, or combination thereof. Accordingly, in at least one of the various embodiments, a benchmarking application, such as, benchmarking application 324, may be arranged to support various types of benchmarking.

In at least one of the various embodiments, benchmarking may be based on one or more industry surveys that may be provided by third-party sources. Also, in at least one of the various embodiments, benchmarking may be based on other enterprises that have their model and/or data co-located in the same cloud environment. E.g., community models.

In at least one of the various embodiments, the benchmarking application may be arranged to use configuration information, templates, or the like, for defining the different type of benchmarking and the actions associated with each type of benchmarking. In some embodiments, the different types of benchmarking may be associated with one or more scripts, programs, custom circuitry (e.g., FPGAs, ASICs, PALs, and so on), modules, or the like, to perform some or all of the actions associated with a type of benchmarking.

At block 1304, in at least one of the various embodiments, the relevant community models may be determined, if any. In at least one of the various embodiments, some benchmarking types may incorporate information from one or more community models.

In at least one of the various embodiments, the benchmarking application may be arranged to identify one or more community models that have one or more similarities with the customer model that is the subject of the benchmarking. In some embodiments, the number of same types of elements included in the models may be used for determining similarity.

In at least one of the various embodiments, a similarity in the values of one or more model elements may also be examined when determining similarity. In some embodiments, two models may have similar model elements, (e.g., the same type of sub-towers) but with values that are much different. For example, two models may both share the same model elements of LAN, Linux, Mainframe, and so on. However, in this example, if one model A has a LAN value of $1,000,000 and the model B has a LAN value of $5,000, model B may not be an appropriate model to use for generating benchmarking information for model A because of the wide disparity in values.

At block 1306, in at least one of the various embodiments, additional relevant information, if any, may be determined. In at least one of the various embodiments, information may be gathered from industry survey information, real-time signals, user input, or the like.

In at least one of the various embodiments, one or more sources of third-party industry survey may be available to provide information for determining benchmarking information. In at least one of the various embodiments, this benchmark values for model elements based on the survey information may be used as another way to compare and/or validate benchmark information generated from the community models. Likewise, the benchmarking information generated from the community models may be used to validate the survey information.

In at least one of the various embodiments, real-time signal information may be captured and included in the benchmark information. In at least one of the various embodiments, real-time signal information may include, geolocation information, weather information, power information (e.g., power quality, power outages, or the like), energy information (e.g., price/cost of energy), production information, sales feeds, price changes, market information streams, or the like, or combination thereof, that may be integrated into the benchmarking information. For example, the cost of operations for a data center may spike in quarter where there several power outages since the data center may have to use more expensive backup power than similarly arranged data centers located in regions that did not experience power outages. Likewise, in at least one of the various embodiments, differences in weather conditions may drive costs up or down between for model elements of different community/customer models.

Accordingly, the additional information may be incorporated into the benchmarking information as additional comparison information. For example, industry survey information may reported to compare with benchmark values. Also, in at least one of the various embodiments, the additional information may be used to generate weight values that may be applied to one or more generated benchmark values. For example, in at least one of the various embodiments, variances in values for similar model elements may be normalized based on variances of weather conditions, energy prices, local scarcity costs, or the like, or combination thereof.

In at least one of the various embodiments, the benchmarking application may be arranged to use configuration information, templates, or the like, for determining how to apply the additional information to the benchmarking information. In some embodiments, the different types of additional information may be associated with one or more scripts, programs, custom circuitry (e.g., FPGAs, ASICs, PALs, and so on), modules, or the like, to perform some or all of the actions associated with applying the additional information to the benchmarking information.

Further, in at least one of the various embodiments, a CMP server computer 324 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed to modify the benchmarking information that is processed for one or more elements of the customer model. Also, in at least one embodiment, weather information (such as temperature, atmospheric pressure, wind speed, humidity, or the like) is collected by a hardware weather sensor and subsequently employed to modify the benchmarking information that is processed for one or more elements of the customer model. Additionally, in at least one embodiment, electrical power information (such as voltage, current, frequency, or the like) is collected by a hardware electrical power sensor and subsequently employed to modify the benchmarking information that is processed for one or more elements of the customer model.

At block 1308, in at least one of the various embodiments, the benchmarking application may iterate over the elements in the customer model. In at least one of the various embodiments, the benchmarking application may iterate of the elements comprising a customer model to process the benchmarking information for one or more elements of the customer model.

In at least one of the various embodiments, the benchmarking application may be arranged to automatically process all of the models that are based on the same standard model at the same time rather than generating benchmarking information for a single customer model.

In at least one of the various embodiments, the benchmarking application may be arranged to generate customized benchmarking for a particular customer model. Accordingly, in at least one of the various embodiments, a given customer model may have specialized/customized configuration associated with it that defines how information for its benchmarks should be generated.

At block 1310, in at least one of the various embodiments, benchmark information corresponding to the element of the customer model may be generated. As mentioned above, more than on model may be processed at the time. Likewise, the benchmarking application may be arranged to use one or concurrent methods to generate benchmarking information for multiple model elements and/or multiple customer models at the same time.

At decision block 1312, in at least one of the various embodiments, if there are more elements that need benchmark information, control may loop back to block 1308; otherwise, control may flow to block 1314.

At block 1314, in at least one of the various embodiments, optionally, a report may be generated by the benchmarking application. In at least one of the various embodiments, the benchmarking application may include benchmarking comparison information showing how the customer model compares to the benchmark model. One of ordinary skill in the art will appreciate that reports may be arranged in various formats. Some reports may compare more than one customer model with the benchmarking information; some reports may shows comparisons of different portions of the benchmarking information; or the like. Further, a benchmark information report may be an internal data structure used for determining if notifications and/or alarms should be generated to bring attention to conditions of interest rather than displaying a report to a user. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture for Benchmark Engines

Figure 14:
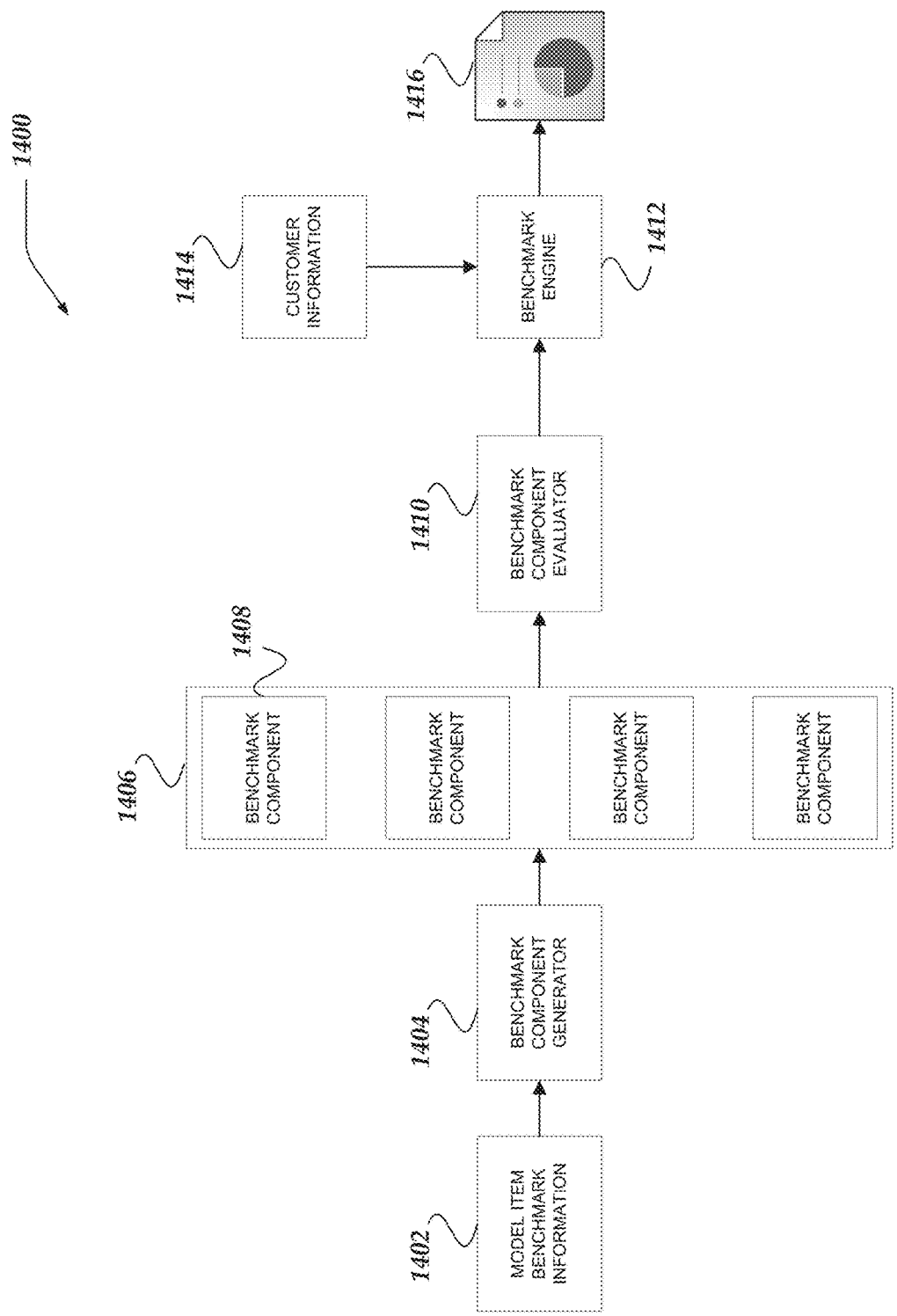
FIG. 14 illustrates a logical schematic of a system for generating benchmark value for a customer in accordance with at least one of the various embodiments.
Figure 15:
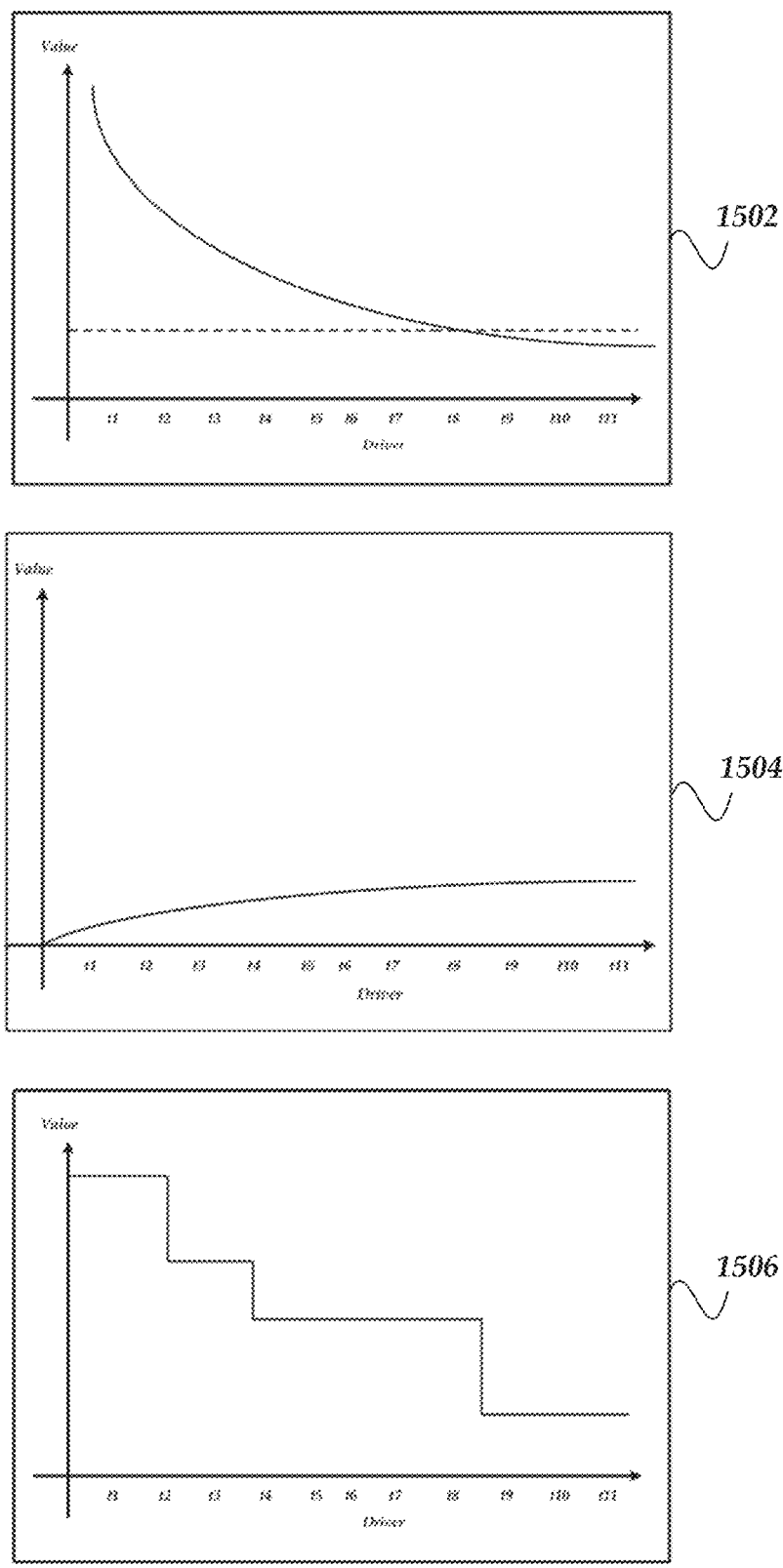
FIG. 15 illustrates graphical examples of benchmark components that may be generated by a benchmark component generator in accordance with at least one of the various embodiments.
Figure 16:
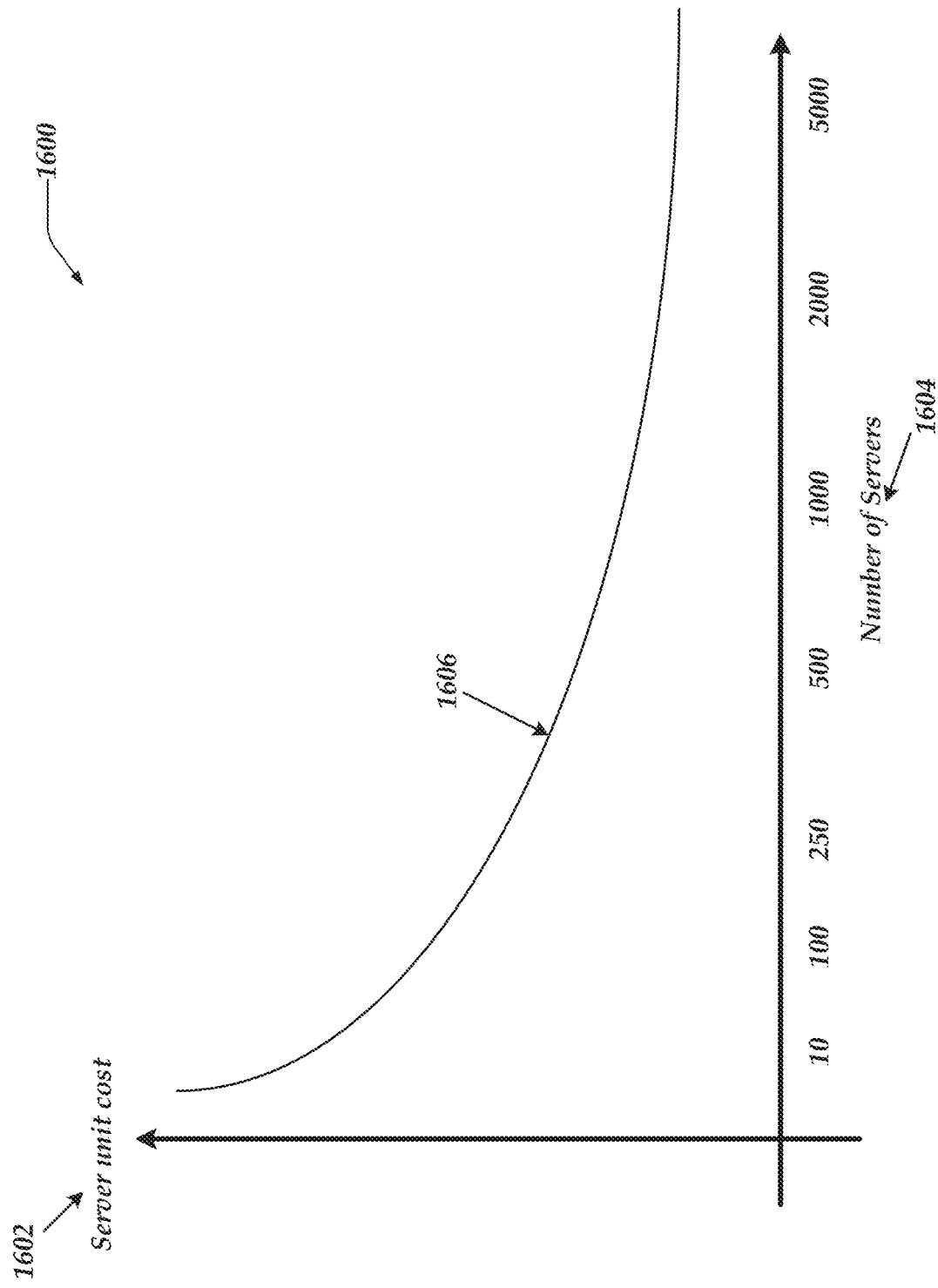
FIG. 16 illustrates a logical representation of a benchmark engine for server computers in accordance with at least one of the various embodiments.

FIGS. 14-16 are presented to illustrate logical architectures and processes at least one of the various embodiments for infrastructure benchmarking based on dynamic cost modeling. In at least one of the various embodiments, models and benchmarking information may be used to generate a benchmark engine. In at least one of the various embodiments, benchmark engines may be arranged to generate a benchmark value from provided customer information. For example, the customer may provide one or more entries based on their own infrastructure models to a benchmark engine that may generate a value that may be used for at least benchmarking.

FIG. 14 illustrates a logical schematic of system 1400 for generating benchmark value for a customer. In at least one of the various embodiments, model item benchmark information 1402 may be provided to and/or processed by benchmark component generator 1404. In at least one of the various embodiments, benchmark component generator 1404 may be arranged to determine one or more benchmark components from model item benchmark information 1402.

In at least one of the various embodiments, model item benchmark may be the collection of information from a variety of sources, as described for FIG. 7. In at least one of the various embodiments, model item benchmark information may be computed from the community model data that represents actual costs associated with infrastructure items of other customers. Also, in at least one of the various embodiments, model item benchmarking information may also be based on industry survey information, such as, industry survey information 718.

In at least one of the various embodiments, model items may be considered to be an item represented in a benchmark model. In at least one of the various embodiments, infrastructure models may have model items, such as, workstations, servers, storage, mainframes, mobile, or the like. (See, FIG. 9). Accordingly, in at least one of the various embodiments, each customer model may be arranged to contain a value, such as, a cost value associated with each model item.

In at least one of the various embodiments, the costs associated with a model item may have one or more separate drivers, such as, numbers of units, location of units, unit types, age of units, number of employees associated with the model items, and so on. In at least one of the various embodiments, the particular cost drivers may be determined based on the customer model and the benchmark models.

In at least one of the various embodiments, each cost driver may contribute to the total cost of the model item. Accordingly, benchmark component generator 1404 may be arranged to generate benchmark components 1406 that correspond to one or more cost drivers of the model item. For example, benchmark component 1408 may represent how a single cost driver impacts the overall costs of the model item. For example, benchmark component 1408 may represent an approximation modelling function such a cost/ per unit over number of units.

In at least one of the various embodiments, benchmark components may be generated by applying one or more curve fitting algorithms using the benchmarking information of the community models to generate the models. In at least one of the various embodiments, each benchmark component may represent a different cost driver that may be associated with the model item.

In at least one of the various embodiments, benchmark components may have different impacts or correlations with the costs associated with a model item. In some embodiments, one or more benchmark components, representing one or more cost drivers, may have stronger correlation to the costs of a model item than others. Some benchmark components may have little correlation with actual costs while other benchmark components may have strong correlations.

In at least one of the various embodiments, benchmark component evaluator 1410 may be arranged to evaluate the significance of the various benchmark components. For example, in at least one of the various embodiments, benchmark components that have correlation strength value that exceeds a defined threshold value may be determined to be significant benchmark components.

In at least one of the various embodiments, additional features of a benchmark component may be employed to evaluate the component, such as, number of samples, variance of the values, excluded by configuration, or the like, or combination thereof.

For example, in at least one embodiment, geolocation information (such as latitude and longitude coordinates, or the like) is collected by a hardware GPS sensor and subsequently employed by a benchmark component evaluator to identify/determine and to evaluate the one or more benchmark components. Similarly, in at least one embodiment, weather information (such as temperature, atmospheric pressure, wind speed, humidity, or the like) is collected by a hardware weather sensor and subsequently employed by a benchmark component evaluator to identify/determine and to evaluate the one or more benchmark components. Additionally, in at least one embodiment, electrical power information (such as voltage, current, frequency, or the like) is collected by a hardware electrical power sensor and subsequently employed by a benchmark component evaluator to identify/determine and to evaluate the one or more benchmark components.

In at least one of the various embodiments, benchmark component evaluator 1410 may be arranged to generate a benchmark engine, such as, benchmark engine 1412 that may be comprised of one or more benchmark components.

Accordingly, in at least one of the various embodiments, a customer may provide customer information to benchmark engine 1412 to generate a benchmark value, such as, benchmark value 1416. For example, in at least one of the various embodiments, benchmark engine 1412 may be a benchmark engine for benchmarking server costs. Accordingly, in at least one of the various embodiments, if a customer provides the proper inputs to the benchmark engine, it may generate benchmark value. In at least one of the various embodiments, the particular inputs that may be required and the particular benchmark value(s) that may be generated may vary depending on the particular benchmark components that comprise the benchmark engine.

In at least one of the various embodiments, model item information may include geolocation information provided from one or more geolocation devices such as GPS 362 and/or GPS 258. In some embodiments, geolocation information may be provided in real-time from active geolocation sensors. In other embodiments, geolocation information may be collected periodically from geolocation sensors.

FIG. 15 illustrates graphical examples of benchmark components that may be generated by a benchmark component generator in accordance with at least one of the various embodiments. In at least one of the various embodiments, as described above, any given model item may have one or more cost drivers. The individual cost drivers may have more or less correlation, with the total costs corresponding to a model item. For example, component 1502 illustrates an example of the costs per unit associated with a model item decreasing as the cost driver increase. This example shows that the cost drivers corresponding to component 1502 have a significant negative correlation with costs for the item. A concrete example may be that the per unit total cost for server computers decreases and the number of servers under manage increases. This result reflects the cost benefit of economies of scale that may result from having more server computers under management.

In at least one of the various embodiments, the various components that contribute to the total costs of a model item may have more or less impact. For example, component 1504 illustrates a benchmark component that may have a different impact than component 1502. In this example, as the cost drivers increase that total costs are little affected. In at least one of the various embodiments, this may indicate that benchmark component 1504 may be evaluated as not being selected to be included in the benchmark engine because it does not provide significant benchmarking feedback since impact of the cost drive to the total costs of the model item may be below a define threshold.

In at least one of the various embodiments, some components may have step-wise impacts on the total costs of a model item. For example, benchmark component 1506 illustrates a benchmark component that is non-linearly negatively correlated to total costs.

In at least one of the various embodiments, a benchmark component evaluator, such as, benchmark component evaluator 1410 may be arranged compare the impact/contribution the various cost driver benchmark components have on the total costs of the model items. In some embodiments, one or more cost drivers may dominate the total costs or similarly one or more cost drivers may be closely correlated with the per unit total costs of a model item. Likewise, one or more of the cost drivers may contribute little to the overall costs or may have little correlation to the total costs. Accordingly, in at least one of the various embodiments, the benchmark component evaluator may determine which components should be compiled into a benchmark engine.

In at least one of the various embodiments, benchmark components may include geolocation information provided from one or more geolocation devices such as GPS 362 and/or GPS 258. In some embodiments, geolocation information may be provided in real-time from active geolocation sensors. In other embodiments, geolocation information may be collected periodically from geolocation sensors.

FIG. 16 illustrates a logical representation of benchmark engine 1600 for server computers in accordance with at least one of the various embodiments. In this example, for at least one of the various embodiments, axis 1602 represents the unit cost of server computers; axis 1604 represents the number of units (the number of server computers in an enterprise); and curve 1606 represents the benchmark values for server computers. In at least one of the various embodiments, curve 1606 may be generated by $y=F(x)$ where x represents the cost driver, the number of server computers in this example. In at least one of the various embodiments, $F(x)$ may be comprised of one or more benchmark components. Accordingly, in some embodiments, the benchmark engine may produce benchmark values comprised of one or more cost driver functions, such as, $F(x)=a(x)+b(x)+ \ldots +z(x)$. Likewise, in other embodiments, the benchmark engine may comprise one or more components functions for one or more cost drivers, such as, $F(x, y, z)=a(x)+b(y)+c(z) \ldots$, or the like.

As described above, in at least one of the various embodiments, a benchmark component evaluator may be arranged to select the one or more benchmark components based on their individual impact to the cost value be modeled. Likewise, in at least one of the various embodiments, a benchmark component evaluator may be arranged to select/evaluate components based on other features, such as, amount of data, age of data, complexity of component, or the like, or combination thereof.

In at least one of the various embodiments, benchmark components and/or benchmark engine may be updated to reflect changes in the underlying community models and/or survey information. Accordingly, in at least one of the various embodiments, periodically benchmark components and/or benchmark engines may be re-generated to accommodate changes in the underlying data.

Generalized Operations for Benchmarking Engines

Figure 17:
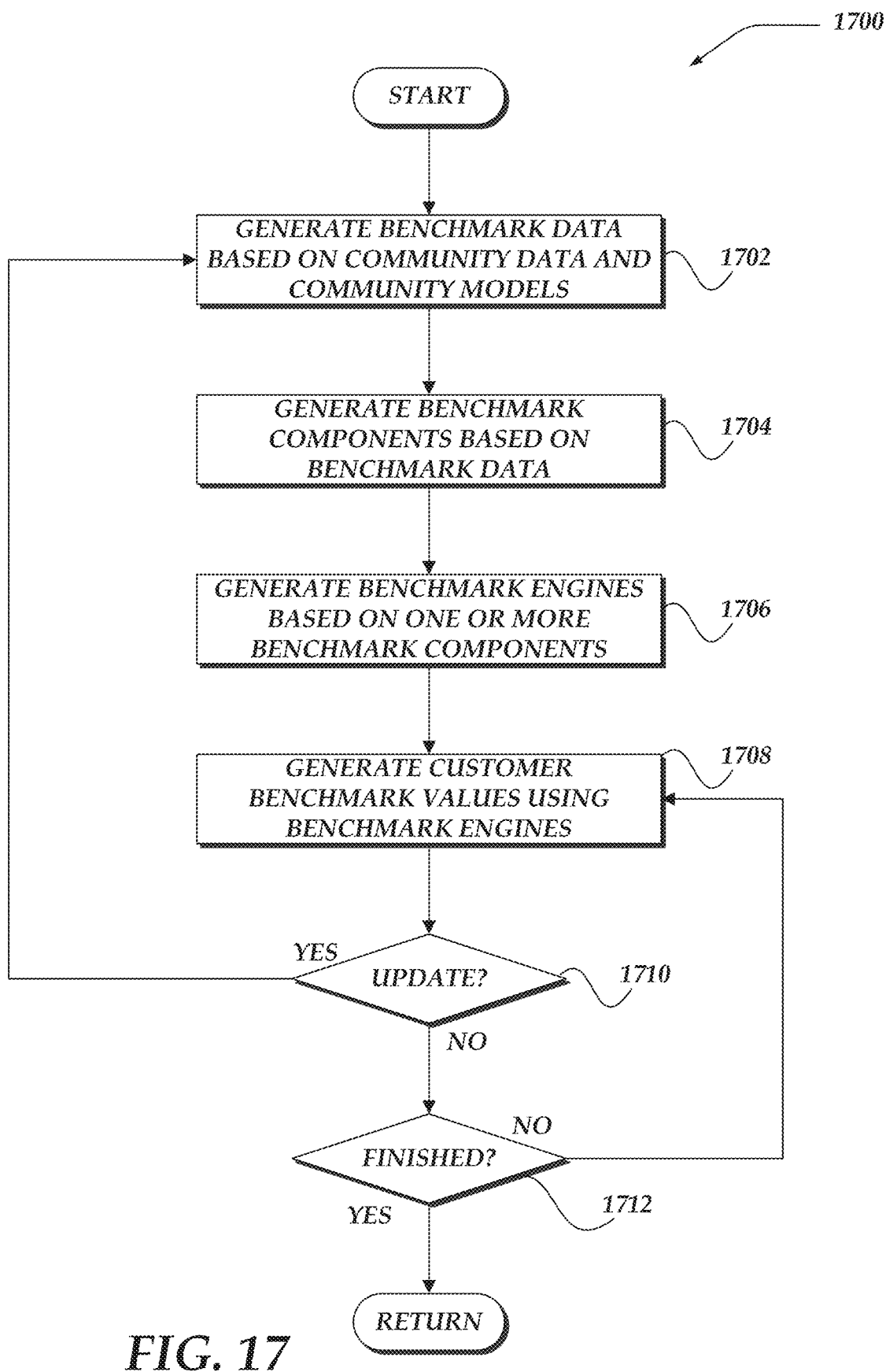
FIG. 17 illustrates a flowchart for a process for generating benchmarking values using benchmarking engines in accordance with at least one of the various embodiments.
Figure 18:
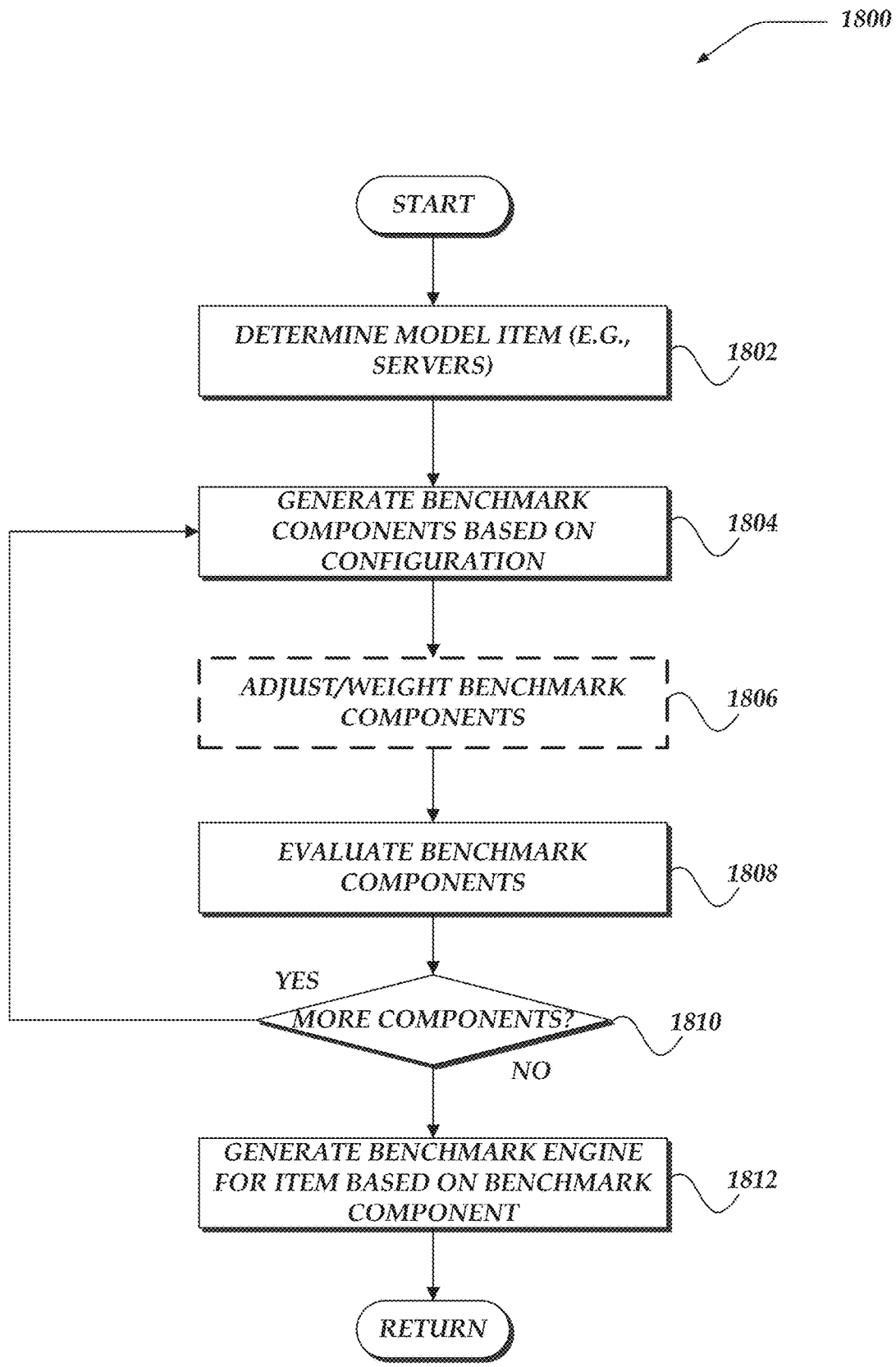
FIG. 18 illustrates a flowchart for a process for generating benchmarking values using benchmarking engines in accordance with at least one of the various embodiments.

FIGS. 17-18 represent the generalized infrastructure benchmarking based on dynamic cost modeling in accordance with at least one of the various embodiments. In at least one of the various embodiments, processes 1700, and 1800 described in conjunction with FIGS. 17-18 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 17-18 may be operative in cost modeling and benchmarking architectures such as those described in conjunction with FIGS. 4-9 and FIGS. 14-16.

FIG. 17 illustrates a flowchart for process 1700 for generating benchmarking values using benchmarking engines in accordance with at least one of the various embodiments. After a start block, at block 1702, in at least one of the various embodiments, benchmark data may be generated based on community data and community models. In at least one of the various embodiments, benchmark data may be generated by from community models that may be generated by raw model data supplied and/or obtained from customer infrastructure installations. In at least one of the various embodiments, benchmark data may be represented in data structures such as, tables, databases, or the like, organized using one or more standard models. (See, FIG. 8.)

At block 1704, in at least one of the various embodiments, one or more benchmark components may be generated from the benchmark data. In at least one of the various embodiments, as described above, benchmark components may be used to represent the impact various cost drivers have on the model items comprising the standard models.

In at least one of the various embodiments, the total costs associated with a model item in a community model represents all of the costs that accrue for the model item. For example, if the model item is Linux Servers, the total costs may include hardware costs, energy costs, maintenance costs, employee costs (e.g., IT admin costs), software costs, or the like, that may be associated with a given community member (customer). Accordingly, in at least one of the various embodiments, community models each have cost values that are specific to their particular infrastructure. However, in at least one of the various embodiments, since each community model is based on a standard model, the impact of the various cost drivers may on total costs may be analyzed.

In at least one of the various embodiments, one or more benchmark components may be generated in part by using one or more curve fitting techniques to produce functions that represent how the total costs are related to a given cost driver. In some embodiments, the total costs may be considered as total costs per unit. This enables one or more benchmark component to represent how different values of a given cost driver affect the cost per unit of a model item, such as, server computers.

For example, in at least one embodiment, geolocation information (such as latitude and longitude coordinates, or the like) is collected by a hardware GPS sensor and subsequently employed by a benchmark component evaluator to identify/determine and to evaluate the one or more benchmark components. Similarly, in at least one embodiment, weather information (such as temperature, atmospheric pressure, wind speed, humidity, or the like) is collected by a hardware weather sensor and subsequently employed by a benchmark component evaluator to identify/determine and to evaluate the one or more benchmark components. Additionally, in at least one embodiment, electrical power information (such as voltage, current, frequency, or the like) is collected by a hardware electrical power sensor and subsequently employed by a benchmark component evaluator to identify/determine and to evaluate the one or more benchmark components.

At block 1706, in at least one of the various embodiments, one or more benchmark engines may be generated based on the one or more benchmark components. In at least one of the various embodiments, as described above, benchmark engines may be comprised of or more benchmark components. In at least one of the various embodiments, the particular benchmark components that comprise a benchmark engine may be determined by an evaluation of the benchmark components. The selected benchmark components for a model item may be combined in to a benchmark engine for the model item.

At block 1708, in at least one of the various embodiments, customers may use the benchmark engines to generate benchmark values to use to compare against their own values. In at least one of the various embodiments, one or more user interfaces may be arranged to enable customers to use the benchmark values to evaluate the costs of their own infrastructure. In at least one of the various embodiments, the benchmark values provided to the users may be generated from the benchmark engines rather than the community models.

In at least one of the various embodiments, using the benchmark engines alleviates the need to use the actual benchmark data of the community members and/or survey data to produce the benchmark values. In at least one of the various embodiments, the benchmark engine produces benchmark values without using data supplied by other sources or customers. Accordingly, in at least one of the various embodiments, the benchmark engine produces benchmark values without accessing benchmark data supplied and/or owned by other sources or customers.

At decision block 1710, in at least one of the various embodiments, if the benchmark engines are ready to be updated, control may loop back to block 170; otherwise control may continue to decision block 1712. In at least one of the various embodiments, as benchmark data associated with the community models and/or survey data changes overtime the benchmark engines may need to be updated. In at least one of the various embodiments, the updating may occur periodically based on a configured time period, such as, once a month, once a week, or the like.

In other embodiments, the updating may be triggered based on the amount of changes to the benchmark data that are recorded. Accordingly, one or more threshold values may be defined that if exceeded may trigger an update to occur. For example, in at least one of the various embodiments, an update may be triggered if the number of community models increases (or decreases) such that a threshold value is exceeded. Likewise, for example, in at least one of the various embodiments, changes in data such as model item prices, costs, sales revenue, or the like, or combination thereof, may trigger an update.

At decision block 1712, in at least one of the various embodiments, if the customer(s) are not finished generating/viewing benchmark values, control may loop back to block 1708; otherwise, control may be returned to a calling process. In at least one of the various embodiments, generating benchmark values may be activated by user via of a user-interface. However, in other embodiments, the benchmark values may be provided by an application and/or service that provides the values to another application. For example, in some embodiments, the benchmark engines may be arranged to be accessible by various methods, such as, APIs, REST APIs, or the like, or combination thereof.

FIG. 18 illustrates a flowchart for process 1800 for generating benchmarking values using benchmarking engines in accordance with at least one of the various embodiments. After a start block, at block 1802, in at least one of the various embodiments, benchmark model items may be determined for generating one or more benchmark components. As described above, benchmark components may be generated for selected model items. In some embodiments, the model items may be selected based on configuration information. For example, in some embodiments, the model items may selected based on their commonality across the community, proportion of cost (e.g., the model items having the top 'n' biggest impacts on budgets may be selected), availability of relevant benchmark data, or the like, or combination thereof.

At block 1804, in at least one of the various embodiments, one or more benchmark components for the selected model items may be generated. In at least one of the various embodiments, the particular actions employed to generate the components may be determined based on configuration information. Also, in some embodiments, the particular selection of cost drivers, units, and so on, may vary depending on the model items and may be determined based on configuration information.

In at least one of the various embodiments, linear regression may be employed to determine the relationship between model item costs and the cost drivers. Also, goodness of fit of benchmark component curve may be evaluated using least squares regression.

In at least one of the various embodiments, other well-known techniques, such as, Bayesian multivariate linear regression may be used for modeling/curve fitting. Also, in at least one of the various embodiments, configuration settings, or other rules, may be in place to filter and/or establish floors and/or ceilings for the base values based on a priori knowledge of the model items and their relevant cost drivers.

For example, in at least one of the various embodiments, for a model item such as desktop computers, configuration information may indicate that the benchmark components are to be generated in terms of cost per unit. In this example, benchmark components may be generated for computing a desktop computer unit cost vs number of desktop computers; unit cost vs. number of employees, unit cost vs. number of vehicles, unit cost vs. gross sales, or the like.

Likewise, for example, a model item such as environmental expenses (e.g., heating and air-conditioning) benchmark components represent total cost vs. number of employees; total cost vs. number of computer; or the like.

Accordingly, in at least one of the various embodiments, configuration information may be arranged to define the benchmarking units for each model item and/or class/type of model item. Also, in at least one of the various embodiments, customer may customize/configuration the particular model items and/or the unit they would to include as benchmark components. In at least one of the various embodiments, such customization may be provided using a graphical user-interfaces, configuration files, or the like.

At block 1806, in at least one of the various embodiments, optionally, the one or more benchmark components may be further modified based on configuration information and/or user provided customization. For example, one or more benchmark components may be modified because there may be prior knowledge that the benchmark data used to generate them is biased. In at least one of the various embodiments, third party data sources may be consulted to determine if a benchmark component may be based. Also, in at least one of the various embodiments, where community model sample sizes are below a defined threshold, biasing based on one or more external data sources and/or datasets, such as, industry/category standards may be employed to account for biases, such as, biases that may be introduced by a small sample size, or the like.

At block 1808, in at least one of the various embodiments, the one or more generated benchmark components may be evaluated to determine if they should be incorporated into the benchmark engine for the model item. As discussed above, the various benchmark components may have different impacts on the values (e.g., total unit cost) that are being benchmarked. Accordingly, in at least one of the various embodiments, one or more of the less impactful benchmark components may be determined to be excluded from the benchmark engine.

In at least one of the various embodiments, results of best fit analysis, such as, correlation coefficients, goodness of fit, coefficient of determination, chi-squared test, or the like, may be employed to evaluate one or more benchmark components. In at least one of the various embodiments, benchmark components may be rank ordered based on the evaluation. Also, in at least one of the various embodiments, benchmark components may be excluded or included based on exceeding one or more defined threshold values. For example, a predefined threshold value of 0.5 may be defined such that benchmark components having correlation coefficients with a magnitude of less than 0.5 may be excluded. Likewise, configuration information may define a threshold value of 0.9 may be defined such that benchmark components having correlation coefficients with a magnitude of 0.9 or greater may be automatically included in a benchmark engine.

At decision block 1810, in at least one of the various embodiments, if there are more benchmark components to process, control may loop back to block 1804; otherwise, control may flow to block 1812.

At block 1812, in at least one of the various embodiments, one or more of the benchmark components may be incorporated in a benchmark engine. In at least one of the various embodiments, the particular benchmark components may be selected based on the results of the evaluations described in block 1806. In at least one of the various embodiments, only the top benchmark component may be incorporated in the benchmark engine. In at least one of the various embodiments, there may be a defined "top" number of benchmark components that may be selected. Still in other embodiments, the configuration information, such as rule-based policies may be employed to determine the one or more benchmark components that may be included in a benchmark engine. For example, configuration information may be defined such that benchmark components having correlation coefficients with a magnitude of 0.9 or greater may be automatically included in a benchmark engine. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Use Cases

FIGS. 19-23 illustrate non-limiting examples of user interfaces for generalized infrastructure benchmarking based on dynamic cost modeling in accordance with at least one of the various embodiments. One of ordinary skill in the art will appreciate that other user interface may be used without departing for the scope of the innovations described herein. Further, the below described user interfaces are sufficient of ordinary skill in the art to understand and practice the innovations described herein.

Figure 19:
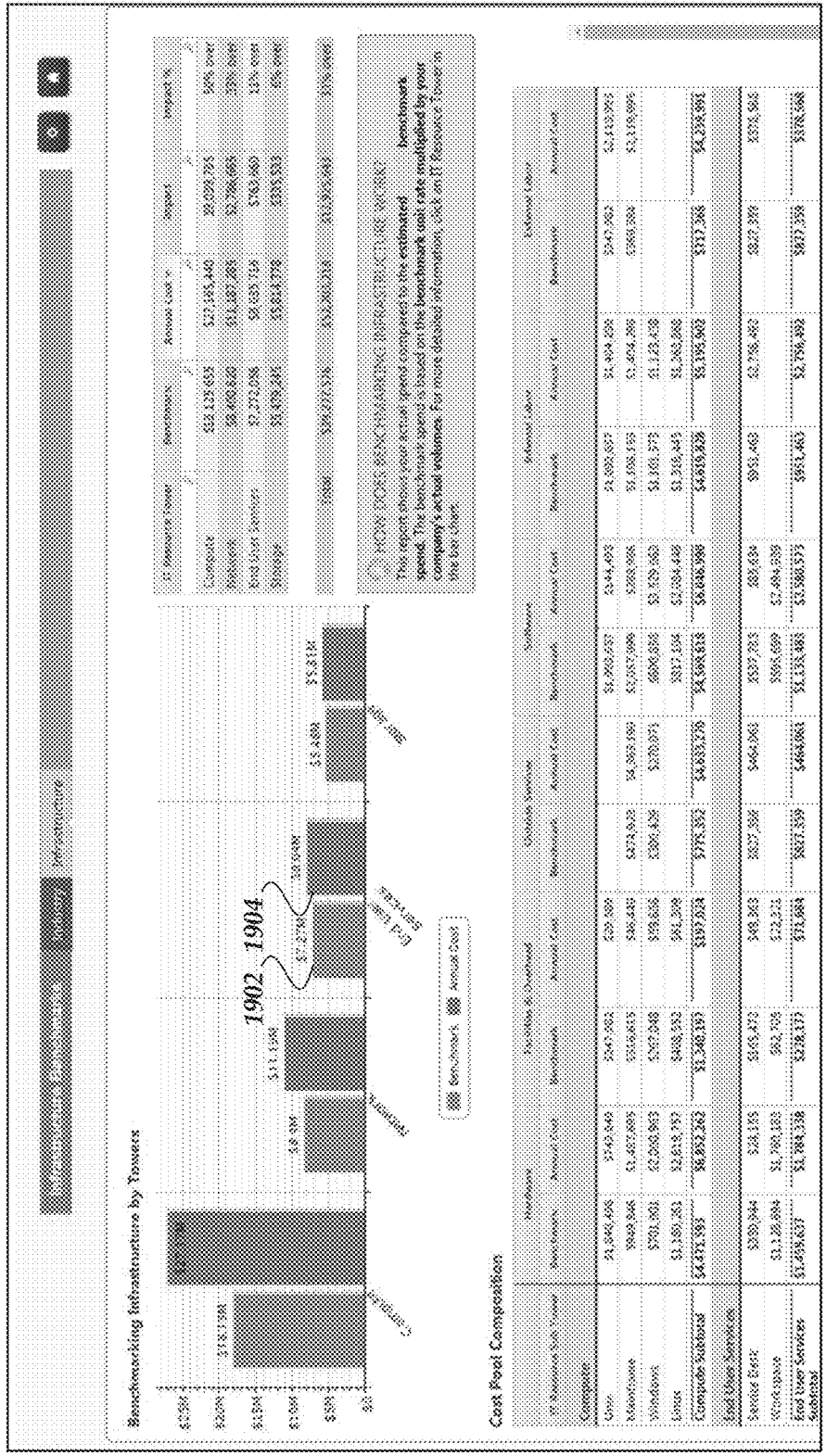
FIG. 19 illustrates a user interface for displaying benchmarking information in accordance with at least one of the various embodiments.

FIG. 19 illustrates user interface 1900 for displaying benchmarking information in accordance with at least one of the various embodiments. In this example, user interface 1900 includes graphical and tabular representation of benchmarking information that may be generated by a benchmarking application, such as, benchmarking application 324. One ordinary skill in the art will appreciate that benchmarking information may be displayed to users using various user-interface and/or reporting formats. In this example, a bar chart may be arranged to visually depict the benchmarking values. Accordingly, column 1902 may represent a benchmark value and column 1904 may represent the actual value that is compared to the benchmark. Likewise, in this example, the benchmarking information may be presented in a tabular format. Here, table column 1906 represents items or aggregated items in the model; table column 1908 represent the benchmark value and table column 1910 represents the actual value.

Figure 20:
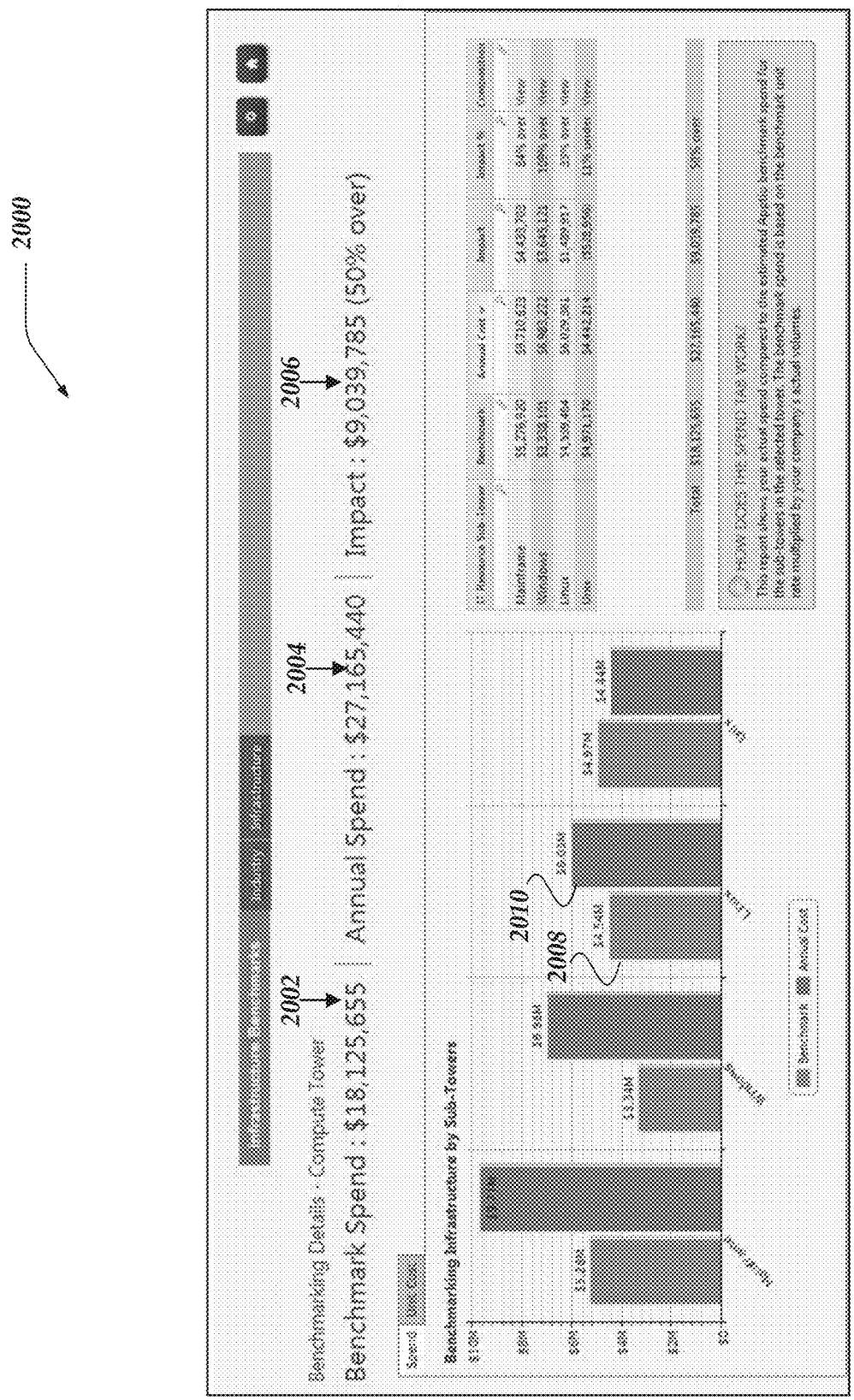
FIG. 20 illustrates a user interface for displaying benchmarking information in accordance with at least one of the various embodiments.

FIG. 20 illustrates user interface 2000 for displaying benchmarking information in accordance with at least one of the various embodiments. In this example, user interface 2000 includes graphical and tabular representation of benchmarking information that may be generated by a benchmarking application, such as, benchmarking application 324. In this example, user interface 2000 is a drill-down view that shows benchmarking information about sub-towers of a cost model.

Accordingly, in at least one of the various embodiments, value 2002 may summarize the benchmark value for the sub-tower (e.g., component of the model); value 2004 may summarize the actual value for the sub-tower; and value 2006 may summarize the difference between the benchmark and the actuals. Also, in at least one of the various embodiments, a bar chart may be arranged to visually depict the benchmarking values. Accordingly, column 2008 may represent a benchmark value and column 2010 may represent the actual value that is compared to the benchmark.

Figure 21:
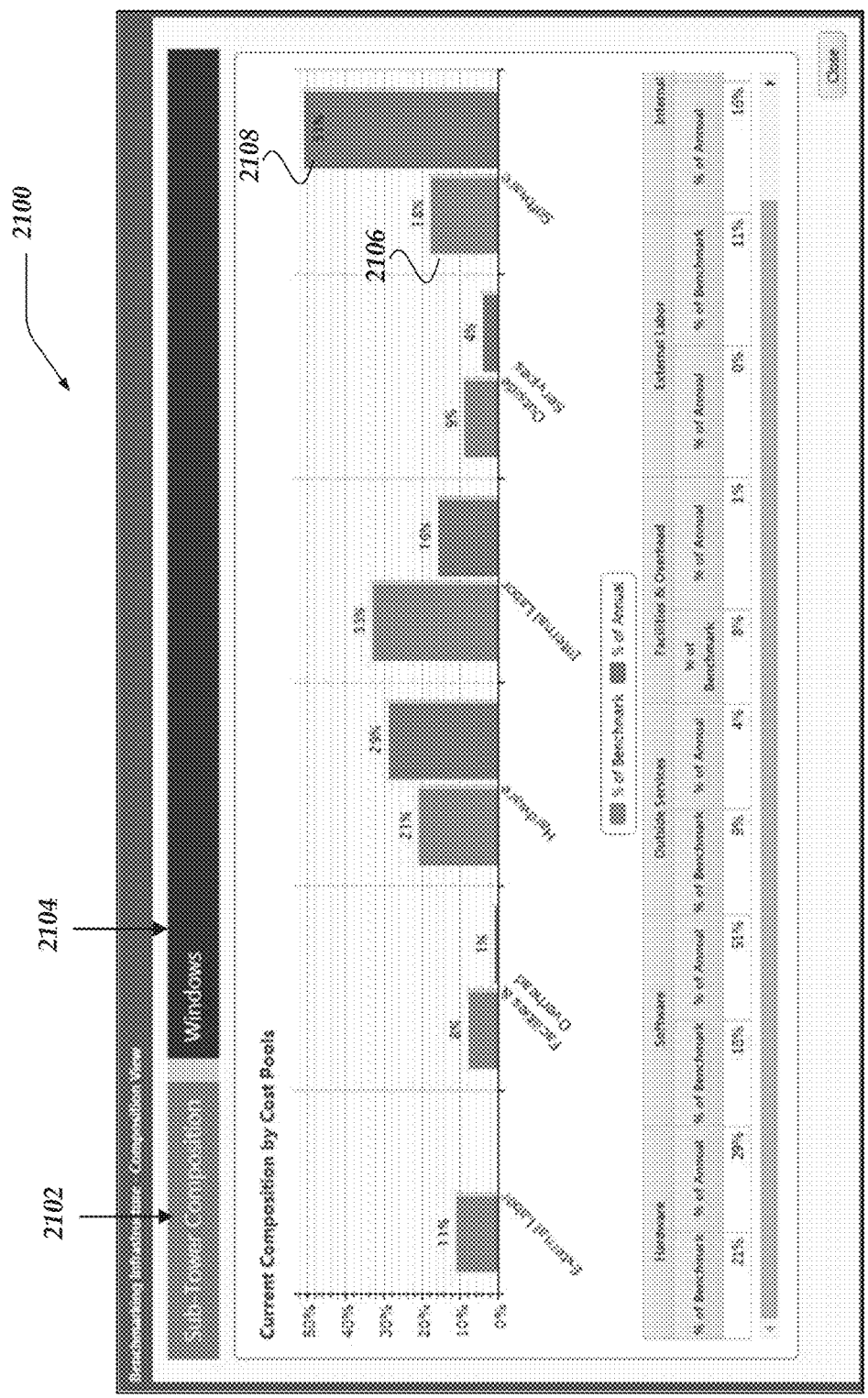
FIG. 21 illustrates a user interface for displaying benchmarking information in accordance with at least one of the various embodiments.

FIG. 21 illustrates user interface 2100 for displaying benchmarking information in accordance with at least one of the various embodiments. In this example, user interface 2100 includes graphical and tabular representation of benchmarking information that may be generated by a benchmarking application, such as, benchmarking application 324. In this example, the information may be related to a single element of a sub-tower. Tab 2104 may indicate the current item in the sub-tower being reviewed (e.g., Windows). Tab 2102 may enable a user to navigate to a higher level view the represents the entire sub-tower (e.g., FIG. 2000).

Also, in at least one of the various embodiments, a bar chart may be arranged to visually depict the benchmarking values. Accordingly, column 2106 may represent a benchmark value and column 2108 may represent the actual value that is compared to the benchmark.

Figure 22:
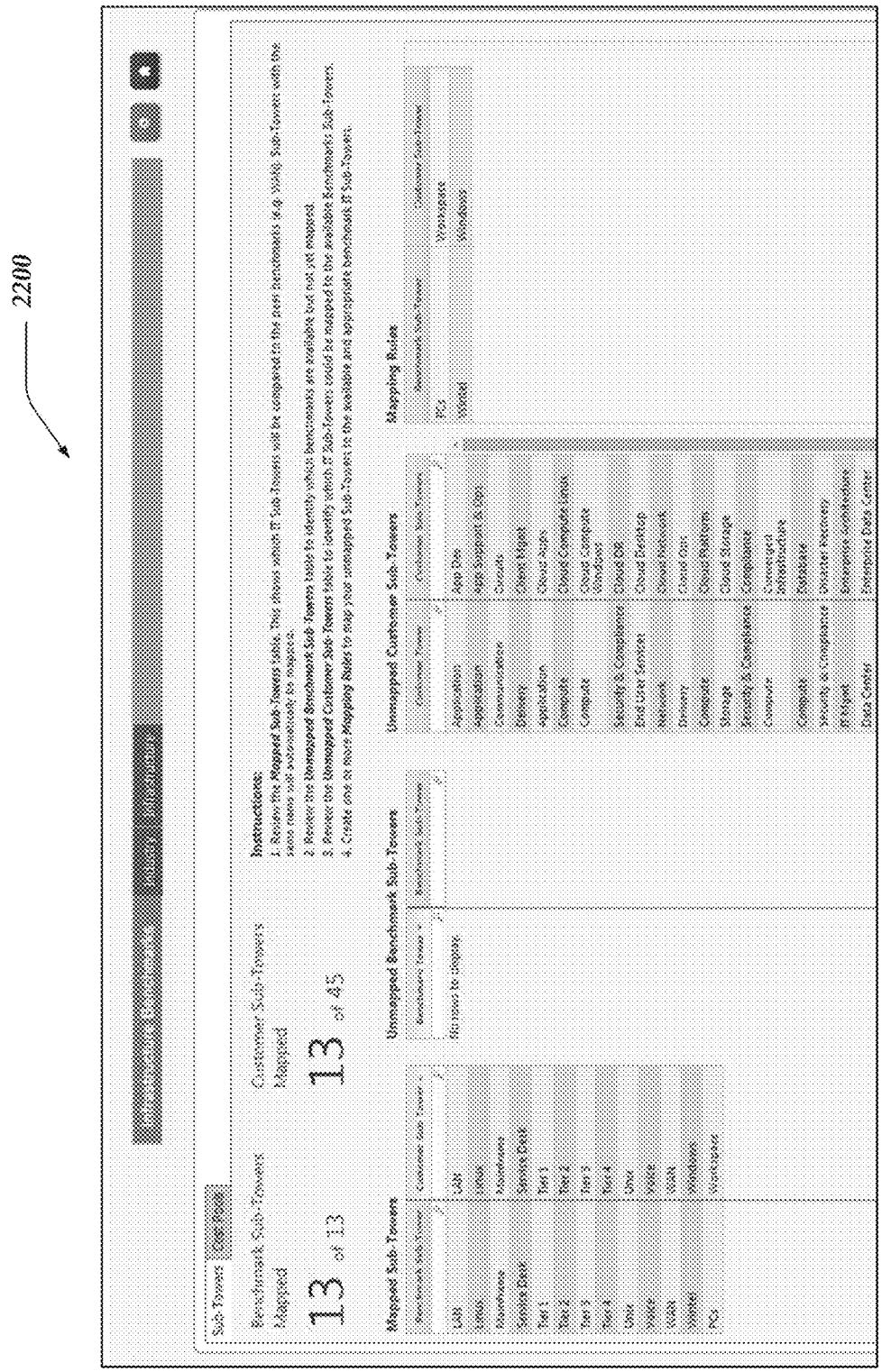
FIG. 22 illustrates a user interface for viewing/generating mapping rules for mapping raw customer models to customer models in accordance with at least one of the various embodiments.

FIG. 22 illustrates user interface 2200 for viewing/generating mapping rules for mapping raw customer models to customer models in accordance with at least one of the various embodiments. In this example, user interface 2200 includes tabular representation of model elements that may be mapped using a benchmarking application, such as, benchmarking application 324.

Figure 23:
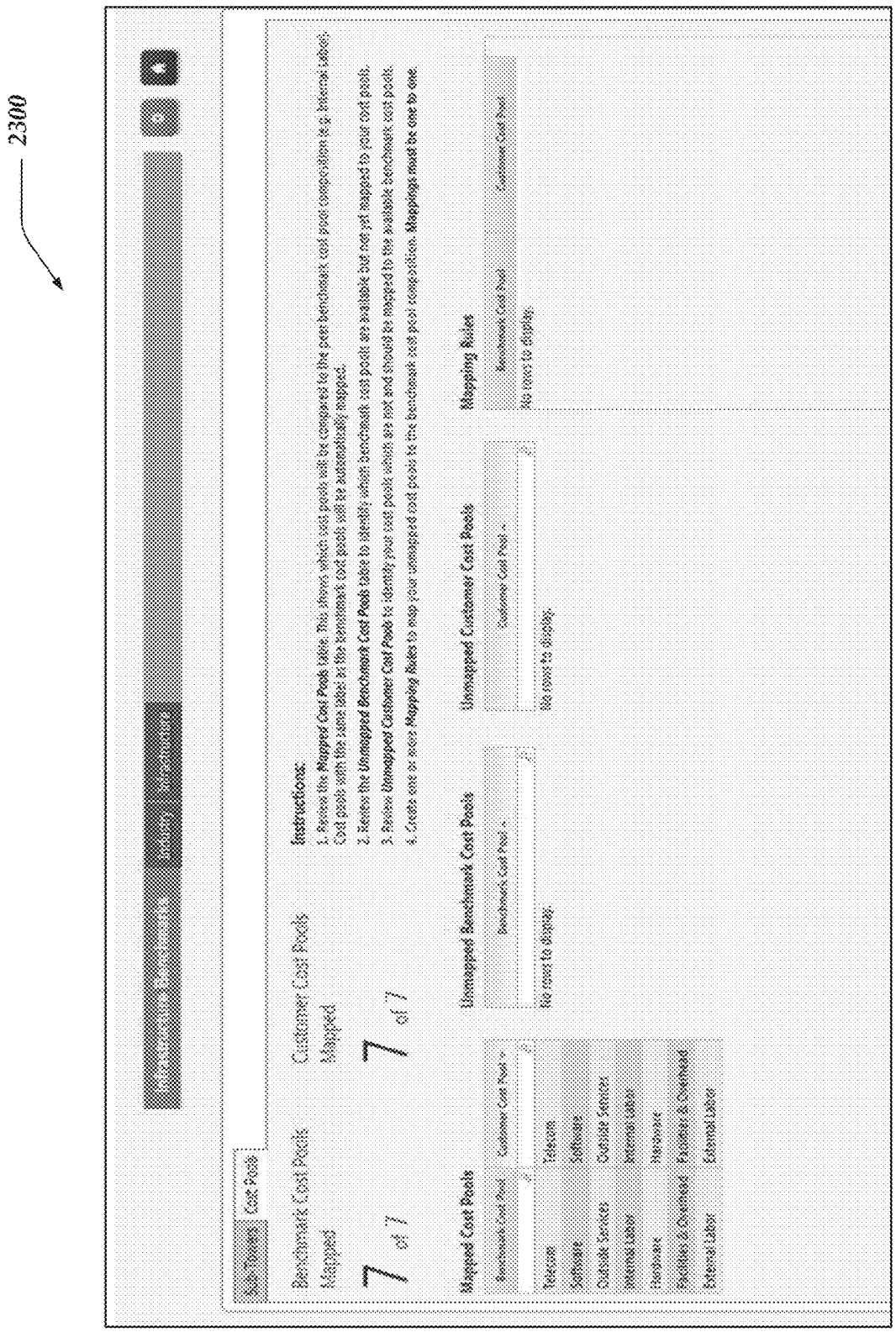
FIG. 23 illustrates a user interface for reviewing mapped models in accordance with at least one of the various embodiments.

FIG. 23 illustrates user interface 2300 for reviewing mapped models in accordance with at least one of the various embodiments. In this example, user interface 2300 includes tabular representation of model elements that may be have been mapped using a benchmarking application, such as, benchmarking application 324.

What is claimed as new and desired to be protected by Letters Patent of the United States is:

1. A method for managing resource allocation using a network computer that includes one or more processors that perform actions comprising:
    employing one or more ingestion components to ingest a raw customer model and its corresponding data, wherein a plug-in architecture is provided for a user to provide the one or more ingestion components;
    providing one or more community models based on the raw customer model data, wherein the raw customer model data is mapped to the one or more community models based on one or more rules for mapping the raw customer model data to one or more standard models;
    providing a plurality of model items based on the one or more community models;
    providing one or more benchmark components that correspond to one or more of the plurality of model items either based on benchmark data included in the one or more community models or based on user customizable configuration information that is employed by one or more benchmark engines to define each model item;
    modifying the one or more benchmark components based on one or more biases of the benchmark data that are identified by one or more of a third party data source and a sample size of the benchmark data that is less than a standard size for a category;
    monitoring different types of externally generated information with a plurality of sensors, wherein geolocation information is monitored by a global positioning systems (GPS) sensor for the network computer, wherein weather information is monitored by a weather information sensor, and wherein electrical power information is monitored by an electrical power sensor;
    ranking the one or more benchmark components for each of the plurality of model items based on an evaluation of each benchmark component's contribution to a total cost value for a corresponding model item, and wherein a combination of the monitored GPS information, monitored weather information, and monitored electrical power information is employed to evaluate the one or more benchmark components by modifying a visual presentation of the bench mark data in the one or more community models based on the monitored geolocation information, the monitored weather information, and the monitored electrical power information, wherein the monitored geolocation information is employed to select one or more features that include time zone, spoken language, currency, or calendar format, wherein the one or more features are employed to modify one or more of a graphical user interface, a database, or an internal process, and wherein the one or more community models are employed to visually represent models of other customers for benchmarking comparisons to a customer model;

employing the graphical user interface (GUI) to change one or more elements of the one or more community models, wherein the change includes one or more a configuration or a mapping rule for the raw customer model;

providing the one or more benchmark components based on the evaluation of each of the benchmark components and a ranking of results of the evaluation and one or more defined threshold values, wherein the one or more benchmark components are provided only when their correlation coefficient exceeds the one or more defined threshold values;

providing the one or more benchmark engines that correspond to one or more of the plurality of model items based on a combination of benchmark components, wherein the configuration information is employed by the one or more benchmark engines to produce benchmark values for the one or more benchmark components without using the benchmark data provided by the one or more community models, customers, or other sources;

storing the one or more benchmark engines in a non-transitory computer readable memory;

employing an update to a value for the raw customer model data that exceeds a threshold to regenerate the one or more benchmark engines to accommodate changes in the underlying raw customer model data based on the updated value for the raw customer model data; and employing the configuration information to use an actual data value of the one or more of the plurality of model items that is provided to retrieve and employ the one or more benchmark engines on the network computer, to generate one or more benchmark values.

2. The method of claim 1, further comprising:
in response to a change in a number of community models that exceeds a threshold value, updating the one or more benchmarking engines based on the change to the number of community models.

3. The method of claim 1, further comprising, modifying the benchmark data included in the one or more community models based on real-time monitored information obtained from one or more of the GPS sensor, the weather information sensor, or the electrical power sensor.

4. The method of claim 1, wherein ranking the one or more benchmark components, further comprises, employing best fit analysis, including one or more, correlation coefficients, goodness of fit, coefficient of determination, or chi-squared test, to evaluate the one or more benchmark components.

5. The method of claim 1, wherein modifying the one or more benchmark components, further comprises, accounting for the one or more biases based on one or more external data sources.

6. The method of claim 1, wherein including the benchmarking data in the one or more community models, further comprises:
providing additional relevant information from one or more external data sources, wherein the additional relevant information, includes one or more of the monitored geolocation information, the monitored weather information, the electrical power information, energy information, production information, sales feeds, price changes, or market information streams; and
modifying the benchmarking data based on the additional relevant information.

7. The method of claim 1, wherein modifying the one or more benchmark components, further comprises, accounting for the one or more biases based on one or more external data sources.

8. The method of claim 1, wherein modifying the one or more benchmark components, further comprises, accounting for the one or more biases based on one or more external data sources.

9. The method of claim 1, wherein modifying the one or more benchmark components, further comprises, accounting for the one or more biases based on one or more external data sources.

10. A system for managing resource allocation, comprising:
a network computer, comprising:
a non-transitory computer readable memory that stores at least instructions; and
one or more processor devices that execute instructions that perform actions, including:
employing one or more ingestion components to ingest a raw customer model and its corresponding data, wherein a plug-in architecture is provided for a user to provide the one or more ingestion components;
providing one or more community models based on raw customer model data, wherein the raw customer model data is mapped to the one or more community models based on one or more rules for mapping the raw customer model data to one or more standard models;
providing a plurality of model items based on the one or more community models;
providing one or more benchmark components that correspond to one or more of the plurality of model items either based on benchmark data included in the one or more community models or based on user customizable configuration information that is employed by one or more benchmark engines to define each model item;
modifying the one or more benchmark components based on one or more biases of the benchmark data that are identified by one or more of a third party data source and a sample size of the benchmark data that is less than a standard size for a category;
monitoring different types of externally generated information with a plurality of sensors, wherein geolocation information is monitored by a global positioning systems (GPS) sensor for the network computer, wherein weather information is monitored by a weather information sensor, and wherein electrical power information is monitored by an electrical power sensor;

ranking the one or more benchmark components for each of the plurality of model items based on an evaluation of each benchmark component's contribution to a total cost value for a corresponding model item, and wherein a combination of the monitored GPS information, monitored weather information, and monitored electrical power information is employed to evaluate the one or more benchmark components by modifying a visual presentation of the bench mark data in the one or more community models based on the monitored geolocation information, the monitored weather information, and the monitored electrical power information, wherein the monitored geolocation information is employed to select one or more features that include time zone, spoken language, currency, or calendar format, wherein the one or more features are employed to modify one or more of a graphical user interface, a database, or an internal process, and wherein the one or more community models are employed to visually represent models of other customers for benchmarking comparisons to a customer model;

employing the graphical user interface (GUI) to change one or more elements of the one or more community models, wherein the change includes one or more a configuration or a mapping rule for the raw customer model;

providing the one or more benchmark components based on the evaluation of each of the benchmark components and a ranking of results of the evaluation and one or more defined threshold values, wherein the one or more benchmark components are provided only when their correlation coefficient exceeds the one or more defined threshold values;

providing the one or more benchmark engines that correspond to one or more of the plurality of model items based on a combination of benchmark components, wherein the configuration information is employed by the one or more benchmark engines to produce benchmark values for the one or more benchmark components without using the benchmark data provided by the one or more community models, customers, or other sources;

storing the one or more benchmark engines in a non-transitory computer readable memory;

employing an update to a value for the raw customer model data that exceeds a threshold to regenerate the one or more benchmark engines to accommodate changes in the underlying raw customer model data based on the updated value for the raw customer model data; and employing the configuration information to use an actual data value of the one or more of the plurality of model items that is provided to retrieve and employ the one or more benchmark engines on the network computer, to generate one or more benchmark values; and a client computer, comprising:
a non-transitory computer memory that stores at least instructions; and
one or more processor devices that execute instructions that perform actions, including:
displaying the one or more benchmark values.

11. The system of claim 10, further comprising:
in response to a change in a number of community models that exceeds a threshold value, updating the one or more benchmarking engines based on the change to the number of community models.

12. The system of claim 10, wherein the network computer's one or more processor devices execute instructions that perform actions, further comprising, modifying the benchmark data included in the one or more community models based on real-time monitored information obtained from one or more of the GPS sensor, the weather information sensor, or the electrical power sensor.

13. The system of claim 10, wherein ranking the one or more benchmark components, further comprises, employing best fit analysis, including one or more, correlation coefficients, goodness of fit, coefficient of determination, or chi-squared test, to evaluate the one or more benchmark components.

14. The system of claim 10, wherein including the benchmarking data in the one or more community models, further comprises:
providing additional relevant information from one or more external data sources, wherein the additional relevant information, includes one or more of the monitored geolocation information, the monitored weather information, the monitored electrical power information, energy information, production information, sales feeds, price changes, or market information streams; and
modifying the benchmarking data based on the additional relevant information.

15. A processor readable non-transitory storage media that includes instructions for managing resource allocation, wherein execution of the instructions by one or more processors of a network computer performs actions, comprising:
employing one or more ingestion components to ingest a raw customer model and its corresponding data, wherein a plug-in architecture is provided for a user to provide the one or more ingestion components;
providing one or more community models based on raw customer model data, wherein the raw customer model data is mapped to the one or more community models based on one or more rules for mapping the raw customer model data to one or more standard models;
providing a plurality of model items based on the one or more community models;
providing one or more benchmark components that correspond to one or more of the plurality of model items either based on benchmark data included in the one or more community models or based on user customizable configuration information that is employed by one or more benchmark engines to define each model item;
modifying the one or more benchmark components based on one or more biases of the benchmark data that are identified by one or more of a third party data source and a sample size of the benchmark data that is less than a standard size for a category;
monitoring different types of externally generated information with a plurality of sensors, wherein geolocation information is monitored by a global positioning systems (GPS) sensor for the network computer, wherein weather information is monitored by a weather information sensor, and wherein electrical power information is monitored by an electrical power sensor;

ranking the one or more benchmark components for each of the plurality of model items based on an evaluation of each benchmark component's contribution to a total cost value for a corresponding model item, and wherein a combination of the monitored GPS information, monitored weather information, and monitored electrical power information is employed to evaluate the one or more benchmark components by modifying a visual presentation of the bench mark data in the one or more community models based on the monitored geolocation information, the monitored weather information, and the monitored electrical power information, wherein the monitored geolocation information is employed to select one or more features that include time zone, spoken language, currency, or calendar format, wherein the one or more features are employed to modify one or more of a graphical user interface, a database, or an internal process, and wherein the one or more community models are employed to visually represent models of other customers for benchmarking comparisons to a customer model;

employing the graphical user interface (GUI) to change one or more elements of the one or more community models, wherein the change includes one or more a configuration or a mapping rule for the raw customer model;

providing the one or more benchmark components based on the evaluation of each of the benchmark components and a ranking of results of the evaluation and one or more defined threshold values, wherein the one or more benchmark components are provided only when their correlation coefficient exceeds the one or more defined threshold values;

providing the one or more benchmark engines that correspond to one or more of the plurality of model items based on a combination of benchmark components, wherein the configuration information is employed by the one or more benchmark engines to produce benchmark values for the one or more benchmark components without using the benchmark data provided by the one or more community models, customers, or other sources;

storing the one or more benchmark engines in a non-transitory computer readable memory;

employing an update to a value for the raw customer model data that exceeds a threshold to regenerate the one or more benchmark engines to accommodate changes in the underlying raw customer model data based on the updated value for the raw customer model data; and employing the configuration information to use an actual data value of the one or more of the plurality of model items that is provided to retrieve and employ the one or more benchmark engines on the network computer, to generate one or more benchmark values.

16. The media of claim 15, further comprising:
in response to a change in a number of community models that exceeds a threshold value, updating the one or more benchmarking engines based on the change to the number of community models.

17. The media of claim 15, further comprising, modifying the benchmark data included in the one or more community models based on real-time monitored information obtained from one or more of the GPS sensor, the weather information sensor, or the electrical power sensor.

18. The media of claim 15, wherein ranking the one or more benchmark components further comprises, employing best fit analysis, including one or more, correlation coefficients, goodness of fit, coefficient of determination, or chi-squared test, to evaluate the one or more benchmark components.

19. The media of claim 15, wherein including the benchmarking data in the one or more community models, further comprises:
providing, by the one or more hardware processors, additional relevant information from one or more external data sources, wherein the additional relevant information, includes one or more of the monitored geolocation information, the monitored weather information, the electrical power information, energy information, production information, sales feeds, price changes, or market information streams; and
modifying the benchmarking data based on the additional relevant information.

20. A network computer for managing resource allocation, comprising:
a non-transitory computer readable memory that stores at least instructions; and
one or more processor devices that execute instructions that perform actions, including:
employing one or more ingestion components to ingest a raw customer model and its corresponding data, wherein a plug-in architecture is provided for a user to provide the one or more ingestion components;
providing one or more community models based on raw customer model data, wherein the raw customer model data is mapped to the one or more community models based on one or more rules for mapping the raw customer model data to one or more standard models;
providing a plurality of model items based on the one or more community models;
providing one or more benchmark components that correspond to one or more of the plurality of model items either based on benchmark data included in the one or more community models or based on user customizable configuration information that is employed by one or more benchmark engines to define each model item;
modifying the one or more benchmark components based on one or more biases of the benchmark data that are identified by one or more of a third party data source and a sample size of the benchmark data that is less than a standard size for a category;
monitoring different types of externally generated information with a plurality of sensors, wherein geolocation information is monitored by a global positioning systems (GPS) sensor for the network computer, wherein weather information is monitored by a weather information sensor, and wherein electrical power information is monitored by an electrical power sensor;
ranking the one or more benchmark components for each of the plurality of model items based on an evaluation of each benchmark component's contribution to a total cost value for a corresponding model item, and wherein a combination of the monitored GPS information, monitored weather information, and monitored electrical power information is employed to evaluate the one or more benchmark components by modifying a visual presentation of the bench mark data in the one or more community models based on the monitored geolocation information, the monitored weather information, and the monitored electrical power information, wherein the monitored geolocation information is employed to select one or more features that include time zone, spoken language, currency, or calendar format, wherein the one or more features are employed to modify one or more of a graphical user interface, a database, or an internal process, and wherein the one or more community models are employed to visually represent models of other customers for benchmarking comparisons to a customer model;

employing the graphical user interface (GUI) to change one or more elements of the one or more community models, wherein the change includes one or more a configuration or a mapping rule for the raw customer model;

providing the one or more benchmark components based on the evaluation of each of the benchmark components and a ranking of results of the evaluation and one or more defined threshold values, wherein the one or more benchmark components are provided only when their correlation coefficient exceeds the one or more defined threshold values;

providing the one or more benchmark engines that correspond to one or more of the plurality of model items based on a combination of benchmark components, wherein the configuration information is employed by the one or more benchmark engines to produce benchmark values for the one or more benchmark components without using the benchmark data provided by the one or more community models, customers, or other sources;

storing the one or more benchmark engines in a non-transitory computer readable memory;

employing an update to a value for the raw customer model data that exceeds a threshold to regenerate the one or more benchmark engines to accommodate changes in the underlying raw customer model data based on the updated value for the raw customer model data; and employing the configuration information to use an actual data value of the one or more of the plurality of model items that is provided to retrieve and employ the one or more benchmark engines on the network computer, to generate one or more benchmark values.

21. The network computer of claim 20, further comprising:

in response to a change in a number of community models that exceed a threshold value, updating the one or more benchmarking engines based on the change to the number of community models.

22. The network computer of claim 20, further comprising, modifying the benchmark data included in the one or more community models based on real-time monitored information obtained from one or more of the GPS sensor, the weather information sensor, or the electrical power sensor.

23. The network computer of claim 20, wherein ranking the one or more benchmark components, further comprises, employing best fit analysis, including one or more, correlation coefficients, goodness of fit, coefficient of determination, or chi-squared test, to evaluate the one or more benchmark components.

24. The network computer of claim 20, wherein including the benchmarking data in the one or more community models, further comprises:

providing additional relevant information from one or more external data sources, wherein the additional relevant information, includes one or more of the monitored geolocation information, the monitored weather information, the monitored electrical power information, energy information, production information, sales feeds, price changes, or market information streams; and modifying the benchmarking data based on the additional relevant information.

\* \* \* \* \*